(12) United States Patent
    Jiang

(10) Patent No.: US 11,138,444 B2
(45) Date of Patent: Oct. 5, 2021

(54) METHODS AND DEVICES FOR PROCESSING IMAGES OF A TRAFFIC LIGHT

(71) Applicant: ZHEJIANG DAHUA TECHNOLOGY CO., LTD., Zhejiang (CN)

(72) Inventor: Xiaotao Jiang, Hangzhou (CN)

(73) Assignee: ZHEJIANG DAHUA TECHNOLOGY CO, , LTD., Hangzhou (CN)

( * ) Notice: Subject to any disclaimer, the term of this patent is extended or adjusted under 35 U.S.C. 154(b) by 84 days.

(21) Appl. No.: 16/702,622

(22) Filed: Dec. 4, 2019

(65) Prior Publication Data

US 2020/0106942 A1    Apr. 2, 2020

Related U.S. Application Data

(63) Continuation of application No. PCT/CN2018/089162, filed on May 31, 2018.

(30) Foreign Application Priority Data

Jun. 8, 2017    (CN) .......................... 201710428320.0
Sep. 19, 2017   (CN) .......................... 201710852496.9

(51) Int. Cl.
    *G06K 9/00*    (2006.01)
    *G06T 5/50*    (2006.01)
    (Continued)

(52) U.S. Cl.
    CPC ....... *G06K 9/00785* (2013.01); *G06K 9/4661* (2013.01); *G06T 5/005* (2013.01);
    (Continued)

(58) Field of Classification Search
    CPC .... G06K 9/00785; G06K 9/4661; G06K 9/20; G06K 9/3233; G06K 9/00818;
    (Continued)

(56) References Cited

U.S. PATENT DOCUMENTS 8,345,964 B2      1/2013  Chen et al.
8,576,069 B2 *   11/2013  Nadeem ........... G08G 1/096775
                                                  340/539.25
(Continued)

FOREIGN PATENT DOCUMENTS

CN    103468987 A    1/2014
CN    103632559 A    3/2014
(Continued)

OTHER PUBLICATIONS

Extended European Search Report in European Application No. 18814282.2 dated Apr. 29, 2020, 8 pages.
(Continued)

*Primary Examiner* — Jose L Couso
(74) *Attorney, Agent, or Firm* — Metis IP LLC

(57) ABSTRACT

A system and a method for processing images are provided. The method obtaining a first image of a target scene under a first exposure time, wherein the target scene may be related to a light status of a light; obtaining a second image of the target scene under a second exposure time; and generating a target image by adjusting the light status in the first image based on the light status in the second image. The method may further include operations to determine whether a predefined light effect exists in the obtained image of the light. Such operations may include: obtaining a light status of a light; obtaining an image of the light in the light status; determining, at least based on the obtained light status of the light, whether a predefined light effect exists in the obtained image of the light.

17 Claims, 14 Drawing Sheets

(51) Int. Cl.
*H04N 5/235* (2006.01)
*H04N 5/243* (2006.01)
*G06K 9/46* (2006.01)
*G06T 5/00* (2006.01)
*G06K 9/20* (2006.01)

(52) U.S. Cl.
CPC ............... *G06T 5/006* (2013.01); *G06T 5/50* (2013.01); *H04N 5/2351* (2013.01); *H04N 5/2352* (2013.01); *H04N 5/2353* (2013.01); *H04N 5/2355* (2013.01); *H04N 5/2356* (2013.01); *H04N 5/243* (2013.01); *G06K 9/20* (2013.01); *G06T 2207/10024* (2013.01); *G06T 2207/10144* (2013.01); *G06T 2207/20221* (2013.01)

(58) Field of Classification Search
CPC ............. G06K 9/00825; G06K 9/4647; G06K 9/00798; G06K 9/036; G06K 9/4652; G06K 9/6271; G06K 9/00671; G06K 9/00624; G06K 9/00791; G06K 9/2054; G06K 9/4671; G06K 9/4676; G06K 9/6228; G06T 5/006; G06T 5/005; G06T 5/50; G06T 7/90; G06T 7/11; G06T 7/174; G06T 7/73; G06T 2207/20221; G06T 2207/10024; G06T 2207/30252; G06T 2207/10144; G06T 2207/30256; G06T 2207/10004; G06T 2207/10016; H04N 5/235; H04N 5/2352; H04N 5/2353; H04N 5/2355; H04N 5/2356; H04N 5/243; H04N 5/225; H04N 5/2351; G08G 1/09623; G08G 1/04; G08G 1/096783; G08G 1/096716; G08G 1/16; G08G 1/09626; G08G 1/096758; G08G 1/095; G08G 5/0073; B60K 2370/178; B60K 2370/193; B60R 11/04; B60W 2555/60; B60W 30/18154; B60W 30/18159; B60W 50/14; B60T 7/12; B60T 2210/32; B60T 2210/36; G05D 1/0231; G05D 1/0088; G05D 1/00; G05D 1/0246; G05D 2201/0213
See application file for complete search history.

(56) References Cited

U.S. PATENT DOCUMENTS 9,654,738 B1 * 5/2017 Ferguson ........... G06K 9/00805

| | | | |
|---|---|---|---|
| 2009/0080791 A1 | 3/2009 | Chen et al. | |
| 2012/0002082 A1 | 1/2012 | Johnson et al. | |
| 2012/0288138 A1 * | 11/2012 | Zeng | G08G 1/09623 382/103 |
| 2013/0147948 A1 | 6/2013 | Higuchi et al. | |
| 2013/0253754 A1 * | 9/2013 | Ferguson | G06K 9/00791 701/28 |
| 2014/0204209 A1 * | 7/2014 | Huth | G06K 9/00798 348/148 |
| 2014/0313369 A1 | 10/2014 | Kageyama et al. | |
| 2015/0179088 A1 * | 6/2015 | Raman | H04M 1/72481 348/62 |
| 2016/0105656 A1 | 4/2016 | Lin et al. | |
| 2017/0124870 A1 * | 5/2017 | Weber | G08G 1/096783 |
| 2017/0228606 A1 * | 8/2017 | Guan | G06T 7/90 |
| 2018/0211530 A1 * | 7/2018 | Sarkar | G05D 1/0231 |
| 2018/0286233 A1 * | 10/2018 | Suzuki | G08G 1/096783 |
| 2018/0336692 A1 * | 11/2018 | Wendel | G06K 9/3241 |
| 2018/0365991 A1 * | 12/2018 | Yamanoi | G06K 9/00818 |
| 2019/0122059 A1 * | 4/2019 | Zhou | G06T 7/20 |
| 2019/0222766 A1 | 7/2019 | Molgaard et al. | |

FOREIGN PATENT DOCUMENTS

| | | |
|---|---|---|
| CN | 104301621 A | 1/2015 |
| CN | 104966071 A | 10/2015 |
| CN | 105160924 A | 12/2015 |
| CN | 105812674 A | 7/2016 |
| CN | 106651797 A | 5/2017 |
| CN | 107273838 A | 10/2017 |
| CN | 107545556 A | 1/2018 |
| CN | 107730481 A | 2/2018 |

OTHER PUBLICATIONS

Anonymous, Region of Interest, Wikipedia, 2014, 3 pages.
International Search Report in PCT/CN2018/089162 dated Aug. 29, 2018, 4 pages.
Written Opinion in PCT/CN2018/089162 dated Aug. 29, 2018, 6 pages.
First Office Action in Chinese Application No. 201710852496.9 dated Sep. 2, 2019, 21 pages.
Zusheng Peng, Technologies of Real-time Traffic Sign and Light Detection and Recognition, College of Computer Science of Chongqing University, 2012, 74 pages.
Ling Lu et al., Visual C++ Digital Image Processing: Corrosion and Expansion of Binary Images, China Electric Power Press, 2014, 4 pages.

* cited by examiner

1000

```
┌─────────────────────────────────────────────────────────────┐ 1001
│ Determining a minimum circumcircle region of connected      │
│ regions in the binary image, the radius of the minimum      │
│ circumcircle region being r and the centre of the minimum   │
│ circumcircle region being centre                            │
└─────────────────────────────────────────────────────────────┘
                              │
                              ▼
┌─────────────────────────────────────────────────────────────┐ 1002
│ Extending the minimum circumcircle region to determine a    │
│ new circular region with a radius of r'                     │
└─────────────────────────────────────────────────────────────┘
                              │
                              ▼
┌─────────────────────────────────────────────────────────────┐ 1003
│ Determining a weight of a circular fusion mask w            │
└─────────────────────────────────────────────────────────────┘
```

FIG. 10

METHODS AND DEVICES FOR PROCESSING IMAGES OF A TRAFFIC LIGHT

CROSS REFERENCE TO RELATED APPLICATIONS

This application is a Continuation of International Application No. PCT/CN2018/089162 filed on May 31, 2018, which claims priority to Chinese Application No. 201710428320.0, filed on Jun. 8, 2017, Chinese Application No. 201710852496.9, filed on Sep. 19, 2017. The entire contents of above applications are hereby incorporated herein by reference.

TECHNICAL FIELD

The present application typically relates to image processing, and particularly to a method and device for processing an image of a traffic light.

BACKGROUND

Image processing technology is widely used in our daily life. Intelligent transportation system has become an important application field of the image processing technology. Specifically, the intelligent transportation system generally includes an electronic police camera connected to a traffic light system, which is capable of monitoring and/or detecting vehicles passing through the crossroad. For example, when a vehicle violates traffic regulations, the electronic police camera may capture an image of the violated vehicle. The captured image may need not only clearly record the violating process of the vehicle, but also ensure that the license plate number of the vehicle, the status of the traffic light, etc., can be clearly identified. Only in this way, the captured image can be used as an evidence of vehicle violations.

In some embodiments, there may be some errors in the status of the traffic light in the captured image due to factors such as the environmental lighting condition of the traffic light. For example, when the ambient (or environmental) lighting condition where the traffic light locates is dark, it is usually required to increase exposure time in order to clearly identify the vehicle information (such as the type of the vehicle, the color of the vehicle, the license plate number, etc.). However, the increase of the exposure time may make the traffic light oversaturated, i.e., an abnormal traffic light may appear. When the traffic light is oversaturated, the red light will present yellow or white which are the color of the abnormal red light. The green light and/or the yellow light will present white which is the color of the abnormal green light and/or the abnormal yellow light. If the oversaturated condition occurs, the captured image cannot be taken as the evidence for dealing with the vehicle violations. Therefore, an important application of image processing is to determine whether an abnormal traffic light exists in the captured image. When the abnormal traffic light exists in the captured image is determined, the color of the traffic light can be further corrected to recover the color of the traffic light. The corrected captured image may still be taken as the evidence of vehicle violations.

A method for determining whether an abnormal traffic light exists in the captured image in the prior art may generally include acquiring a large number of samples of abnormal traffic lights, and detecting the abnormal traffic lights using a pattern recognition algorithm based on color values and brightness values of the samples. However, erroneous detection may occur in the above method. For example, when the red light oversaturates, the red light may present yellow, and it is difficult to distinguish the red light from the yellow light based on color information and brightness information. In addition, the pattern recognition algorithm may be complicated and time-consuming, and requires a large number of samples. Therefore, the efficiency of detecting the abnormal traffic light in the prior art may be relatively low.

Besides, it is required to correct and/or recover the color of the traffic light. There are two methods for correcting and/or recovering the color of the traffic light. One may include manually calibrating the region of the traffic light, and replacing the image including an abnormal traffic light with an image including a normal traffic light. The other may apply an image processing approach. The later method may include defining a region of interest (ROI) where a traffic light will appear, searching positions of the traffic light that have color cast based on color and brightness information, determining abnormal pixels of the traffic light, and correcting the abnormal pixels. However, the two methods described above cannot avoid erroneous detection of the red light and the yellow light, and cannot recover the shape of the traffic light. Besides, the second method strongly depends on algorithms and is difficult to apply to real-time scenarios.

SUMMARY

The present disclosure is about systems and methods for correcting shape and color distortion of traffic lights in images taken in dark environments. According to an aspect of the present disclosure, a system for processing images may comprise at least one image processing device, wherein during operation, the at least one image processing device may be configured to: obtain a first image of a target scene under a first exposure time, wherein the target scene may be related to a light status of a light; obtain a second image of the target scene under a second exposure time; and generate a target image by adjusting the light status in the first image based on the light status in the second image.

In some embodiments, the light status may be at least one of a red light of the light, a yellow light of the light, or a green light of the light.

In some embodiments, the first exposure time may be longer than the second exposure time, such that a color and a shape of the light status in the second image are substantially correct with respect to a color and a shape of the light, and at least one of the color or the shape of the light status in the first image may be substantially distorted with respect to the color or shape of the light.

In some embodiments, the target scene may be in a first area of interest (AOI), and the light status may be in the first AOI. To adjust the first image, the at least one processor may be further directed to adjust at least one of a shape and a color of the light status in the first AOI of the first image based on the light status in the first AOI of the second image.

In some embodiments, to adjust the first image, the at least one image processing device may be configured to: fuse the first AOI of the first image with the first AOI of the second image.

In some embodiments, to fuse the first AOI of the first image with the first AOI of the second image, the at least one image processing device may be configured to: determine a binary image based on the first image and the second image, the binary image including a first binary value and a second binary value smaller than the first binary value; generate a fusion mask based on the binary image; and fuse the first AOI of the first image with the first AOI of the second image based on the generated fusion mask.

In some embodiments, to determine the binary image, the at least one image processing device may be configured to: for each pixel in the second image, determine a first ratio of a first color channel and a second color channel; for each pixel in the first image, determine a second ratio of the first color channel and the second color channel; upon determining that a difference between the first ratio and the second ratio may be greater than a first threshold, and that the first color cannel in the first image may be greater than a second threshold, assign the pixel with the first binary value.

In some embodiments, the light status may be at least one of a red light of the light, a yellow light of the light, or a green light of the light, and the first color may be the same as the color of the light status.

In some embodiments, before the generating of the target image, the at least one image processing device may be configured to: reduce a halo of the first image at least based on the first color channel of at least one pixel in the first image and the second color channel of at least one pixel first image.

According to a second aspect of the present disclosure, a method for processing images may comprise: obtaining a first image of a target scene under a first exposure time, wherein the target scene may be related to a light status of a light; obtaining a second image of the target scene under a second exposure time; and generating a target image by adjusting the light status in the first image based on the light status in the second image.

In some embodiments, the light status may be at least one of a red light of the light, a yellow light of the light, or a green light of the light.

In some embodiments, the first exposure time may be longer than the second exposure time, such that a color and a shape of the light status in the second image are substantially correct with respect to a color and a shape of the light, and at least one of the color or the shape of the light status in the first image may be substantially distorted with respect to the color or shape of the light.

In some embodiments, the target scene may be in a first area of interest (AOI), and the light status may be in the first AOI; the adjusting of the first image may include adjusting at least one of a shape and a color of the light status in the first AOI of the first image based on the light status in the first AOI of the second image.

In some embodiments, the adjusting of the first image may include: fusing the first AOI of the first image with the first AOI of the second image.

In some embodiments, the fusion of the first AOI of the first image with the first AOI of the second image may include: determining a binary image based on the first image and the second image, the binary image including a first binary value and a second binary value smaller than the first binary value; generating a fusion mask based on the binary image; and fusing the first AOI of the first image with the first AOI of the second image based on the generated fusion mask.

In some embodiments, the determining of the binary image may include: for each pixel in the second image, determining a first ratio of a first color channel and a second color channel; for each pixel in the first image, determining a second ratio of the first color channel and the second color channel; and upon determining that a difference between the first ratio and the second ratio may be greater than a first threshold, and that the first color cannel in the first image may be greater than a second threshold, assigning the pixel with the first binary value.

In some embodiments, the light status may be at least one of a red light of the light, a yellow light of the light, or a green light of the light, and the first color may be the same as the color of the light status.

In some embodiments, before the generating of the target image, the method may further include: reducing a halo of the first image at least based on the first color channel of at least one pixel in the first image and the second color channel of at least one pixel first image.

According to a third aspect of the present disclosure, a system for processing images may comprise at least one image processing device, wherein during operation, the at least one image processing device may be configured to: obtain a light status of a light; obtain an image of the light in the light status; determine, at least based on the obtained light status of the light, whether a predefined light effect exists in the obtained image of the light.

In some embodiments, the light status may be at least one of a red light of the light, a yellow light of the light, or a green light of the light.

In some embodiments, to determine whether the predefined light effect exists in the obtained image of the light, the at least one image processing device may be configured to: extract a halo region and a highlight region in the obtained image based on the light status; and upon a determination that the halo region and the highlight region overlap, determine that the predefined light effect exists in the obtained image.

In some embodiments, to extract the halo region in the obtained image based on the light status, the at least one image processing device may be configured to: for each pixel in the obtained image, determine the pixel to be in the halo region when the color of the pixel may be within a first color range corresponding to the light status.

In some embodiments, to extract the halo region in the obtained image based on the light status, the at least one image processing device may be further configured to: determine a binary image corresponding to the obtained image by assigning at least one pixel in the obtained image with a first binary value or a second binary value according to whether the pixel may be in the halo region; erode the binary image to generate an eroded image; and dilate the eroded image to extract the halo region.

In some embodiments, to extract the highlight region in the obtained image based on the light status, the at least one image processing device may be configured to: for each pixel in the obtained image, determine the pixel to be in the highlight region when the color of the pixel may be within a second color range corresponding to the light status and when the brightness of the pixel may be greater than a threshold.

In some embodiments, to extract the highlight region in the obtained image based on the light status, the at least one image processing device may be further configured to: determine a binary image corresponding to the obtained image by assigning at least one pixel in the obtained image with a first binary value or a second binary value according to whether the pixel may be in the highlight region; erode the binary image to generate an eroded image; and dilate the eroded image to extract the halo region.

In some embodiments, before the extracting of the halo region and the highlight region, the at least one image processing device may be configured to determine a second area of interest (AOI) in the obtained image, and wherein to extract the halo region and the highlight region in the obtained image, the at least one image processing device may be configured to: extract the halo region and the highlight region in the second AOI.

In some embodiments, the halo region may include at least one first connected region, and the highlight region may include at least one second connected region, and the at least one image processing device may be further configured to: for each second connected region, determine an overlapped region between the second connected region and the at least one first connected region; and determine the second connected region to correspond to the predefined light effect when a ratio of the overlapped region and the second connected region may be greater than a threshold.

In some embodiments, the at least one image processing device may be further configured to: adjust at least one of a first color range corresponding to the halo region or a second color range corresponding to the highlight region based on an environmental lighting condition of the light.

In some embodiments, the at least one image processing device may be further configured to: perform a white balance operation on the obtained image to reduce a light effect introduced by the environmental lighting condition of the light.

According to a fourth aspect of the present disclosure, a method for processing images may comprise: obtaining a light status of a light; obtaining an image of the light in the light status; determining, at least based on the obtained light status of the light, whether a predefined light effect exists in the obtained image of the light.

In some embodiments, the light status may be at least one of a red light of the light, a yellow light of the light, or a green light of the light.

In some embodiments, the determining of whether the predefined light effect exists in the obtained image of the light may include: extracting a halo region and a highlight region in the obtained image based on the light status; and upon a determination that the halo region and the highlight region overlaps, determining that the predefined light effect exists in the obtained image.

In some embodiments, to the extracting of the halo region in the obtained image based on the light status may include: for each pixel in the obtained image, determining the pixel to be in the halo region when the color of the pixel may be within a first color range corresponding to the light status.

In some embodiments, the extracting of the halo region in the obtained image based on the light status may include: determining a binary image corresponding to the obtained image by assigning at least one pixel in the obtained image with a first binary value or a second binary value according to whether the pixel may be in the halo region; eroding the binary image to generate an eroded image; and dilating the eroded image to extract the halo region.

In some embodiments, the extracting of the highlight region in the obtained image based on the light status may include: for each pixel in the obtained image, determining the pixel to be in the highlight region when the color of the pixel may be within a second color range corresponding to the light status and when the brightness of the pixel may be greater than a threshold.

In some embodiments, the extracting of the highlight region in the obtained image based on the light status may include: determining a binary image corresponding to the obtained image by assigning at least one pixel in the obtained image with a first binary value or a second binary value according to whether the pixel may be in the highlight region; eroding the binary image to generate an eroded image; and dilating the eroded image to extract the halo region.

In some embodiments, before the extracting of the halo region and the highlight region, the method further includes determining a second area of interest (AOI) in the obtained image, and the extracting of the halo region and the highlight region in the obtained image may include: extracting the halo region and the highlight region in the second AOI.

In some embodiments, the halo region may include at least one first connected region, and the highlight region may include at least one second connected region, and the method may further includes: for each second connected region, determining an overlapped region between the second connected region and the at least one first connected region; and determining the second connected region to correspond to the predefined light effect when a ratio of the overlapped region and the second connected region may be greater than a threshold.

In some embodiments, the method may further include: adjusting at least one of a first color range corresponding to the halo region or a second color range corresponding to the highlight region based on an environmental lighting condition of the light.

In some embodiments, the method may further include: performing a white balance operation on the obtained image to reduce a light effect introduced by the environmental lighting condition of the light.

According to a fifth aspect of the present disclosure, a non-transitory computer readable medium may store instructions which when executed by a processor, causing the processor to execute operations comprising: obtain a first image of a target scene under a first exposure time, wherein the target scene may include a light status; obtain a second image of the target scene under a second exposure time; and generate a target image by adjusting the light status in the first image based on the light status in the second image.

According to a fifth aspect of the present disclosure, a non-transitory computer readable medium may store instructions which when executed by a processor, causing the processor to execute operations comprising: obtain a light status of a light; obtain an image of the light in the light status; determine, at least based on the obtained light status of the light, whether a predefined light effect exists in the obtained image of the light.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

Figure 5A:
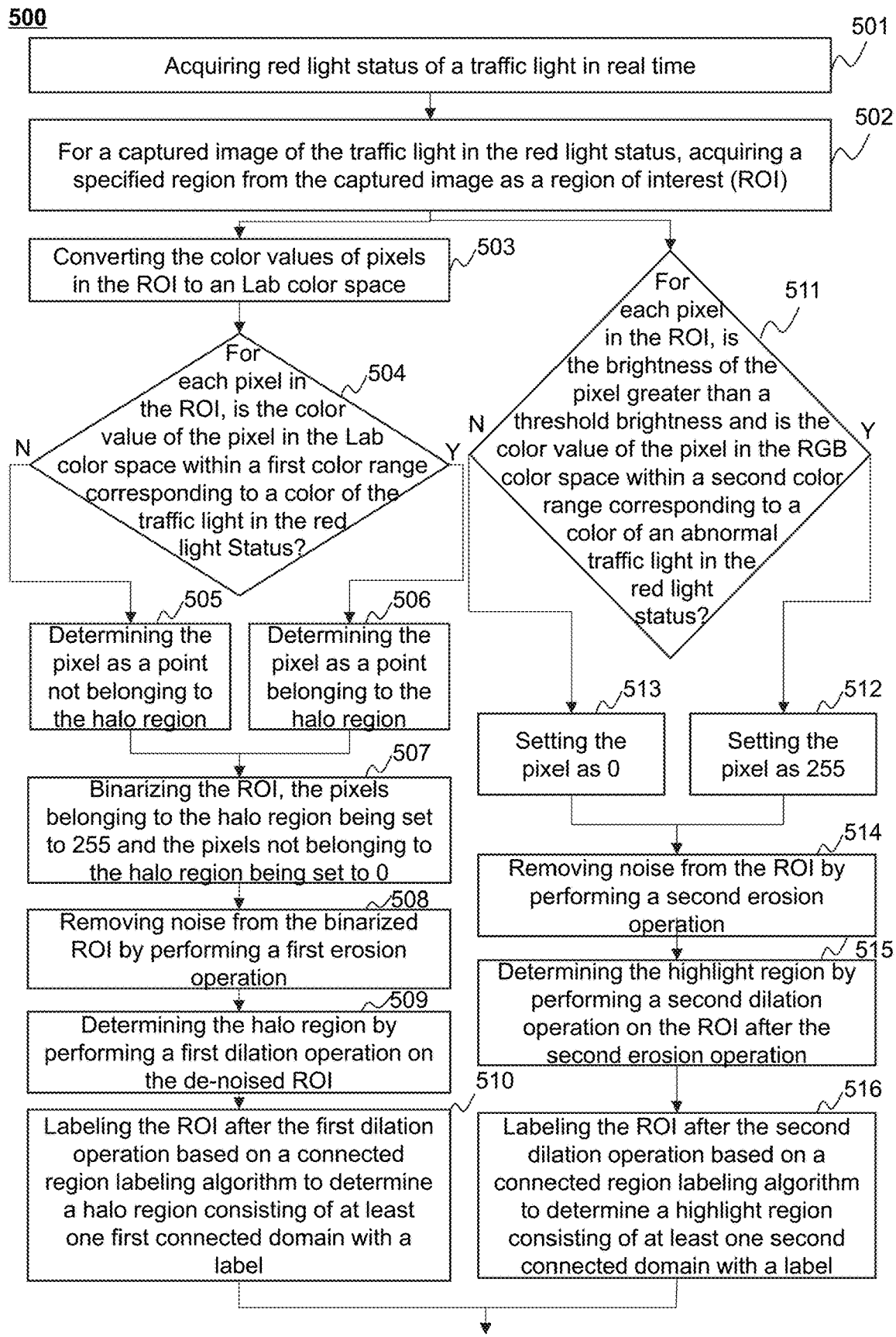
Figure 5B:
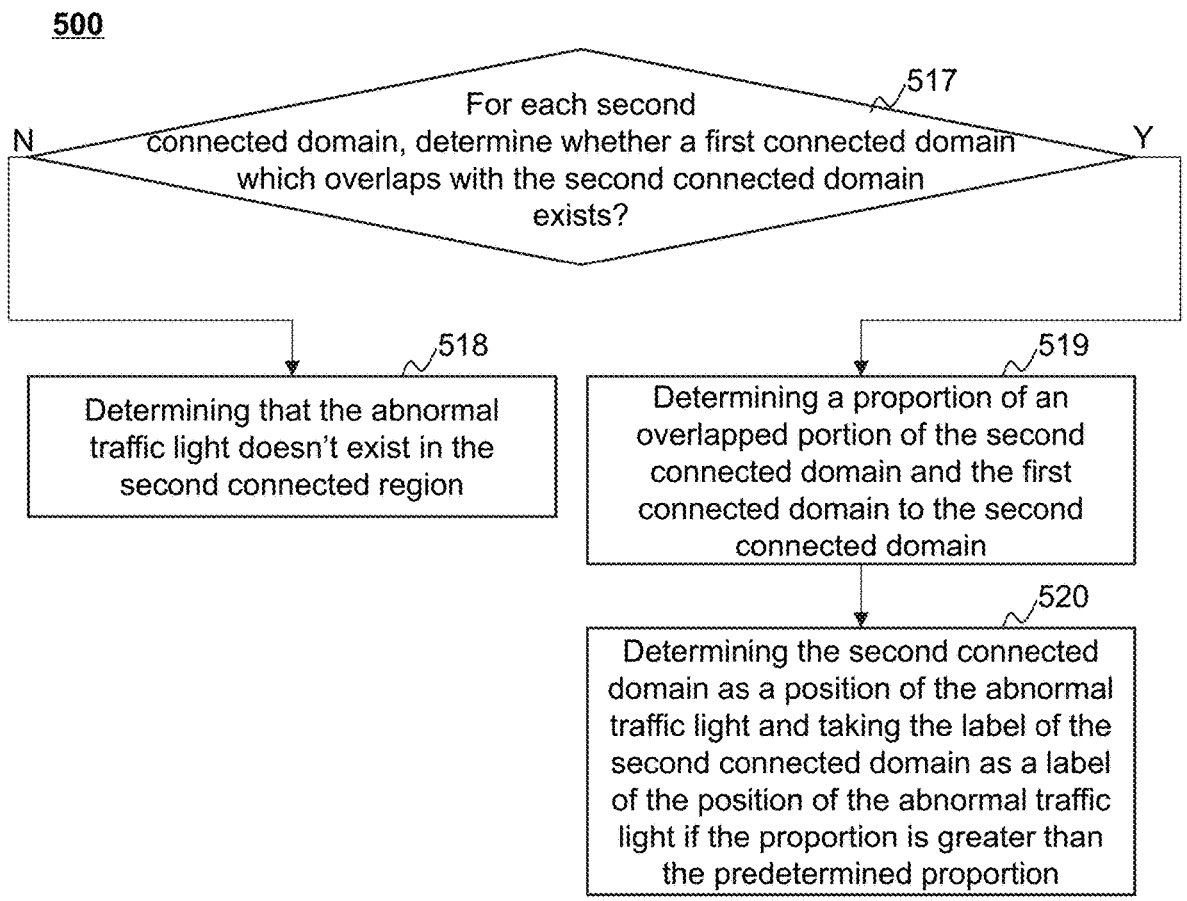
Figure 6:
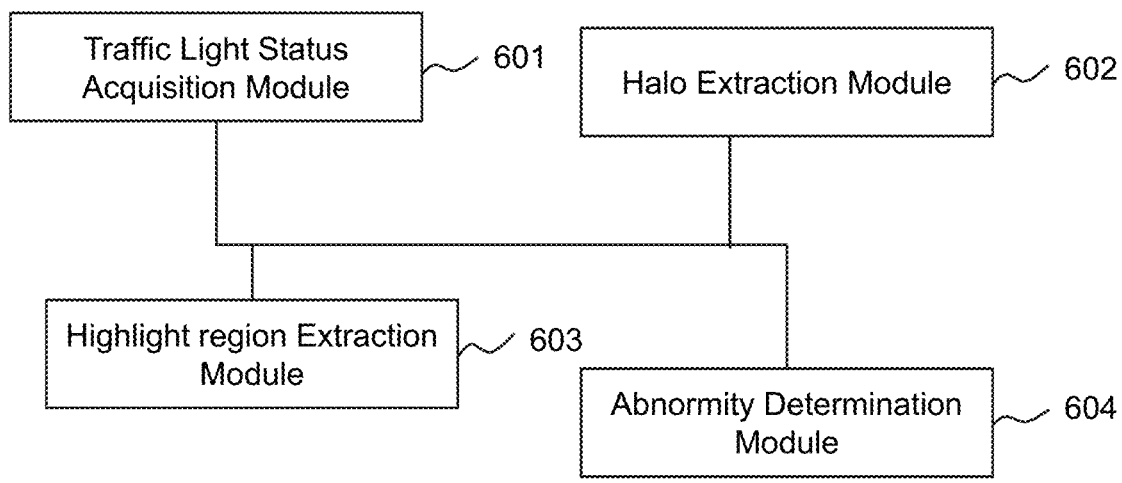
Figure 7:
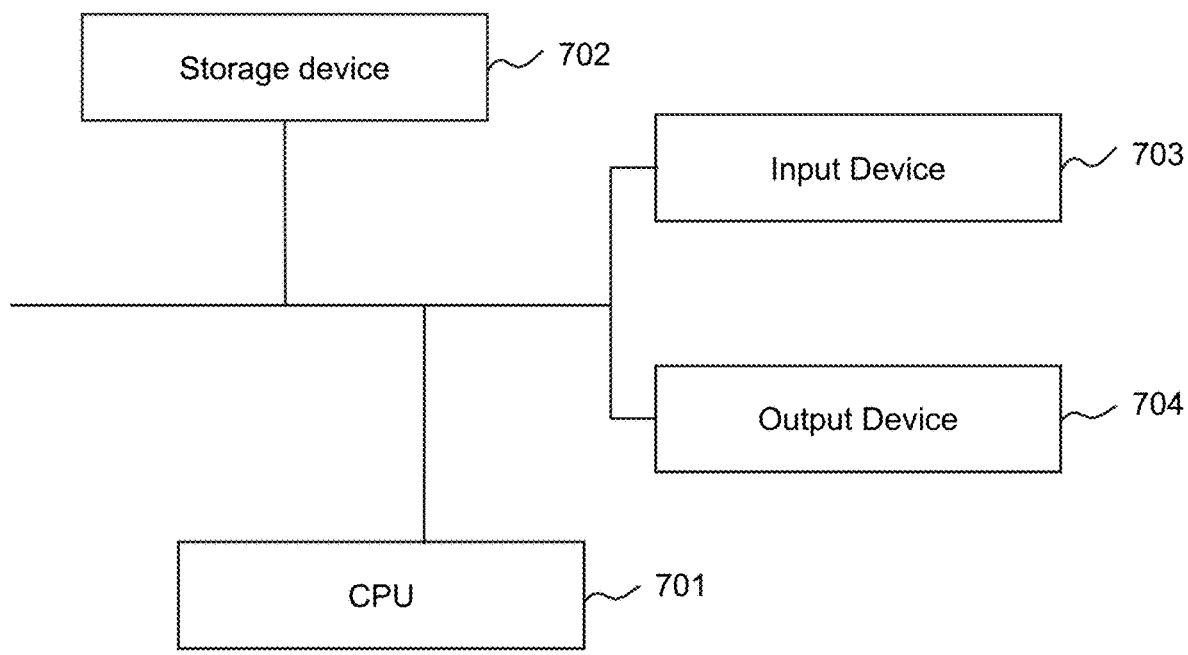
Figure 8:
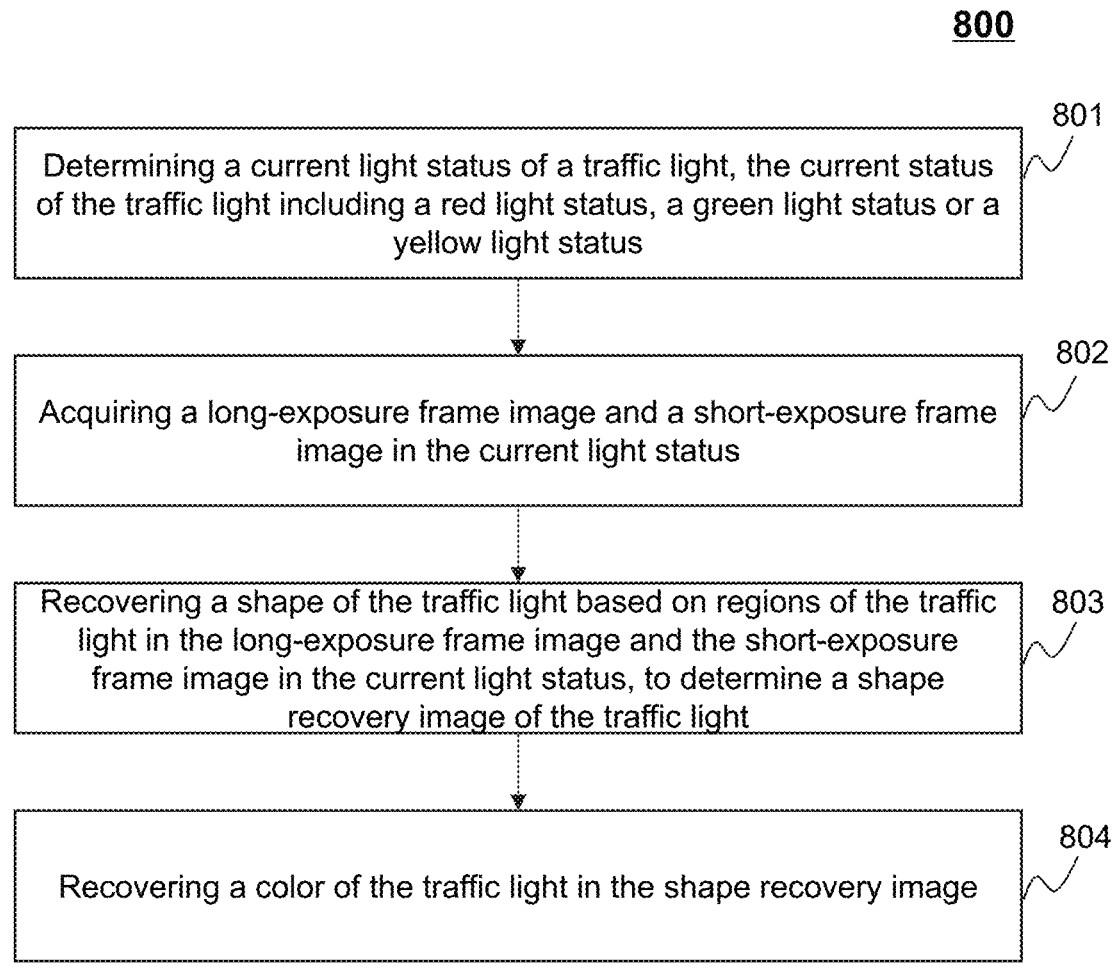
Figure 9:
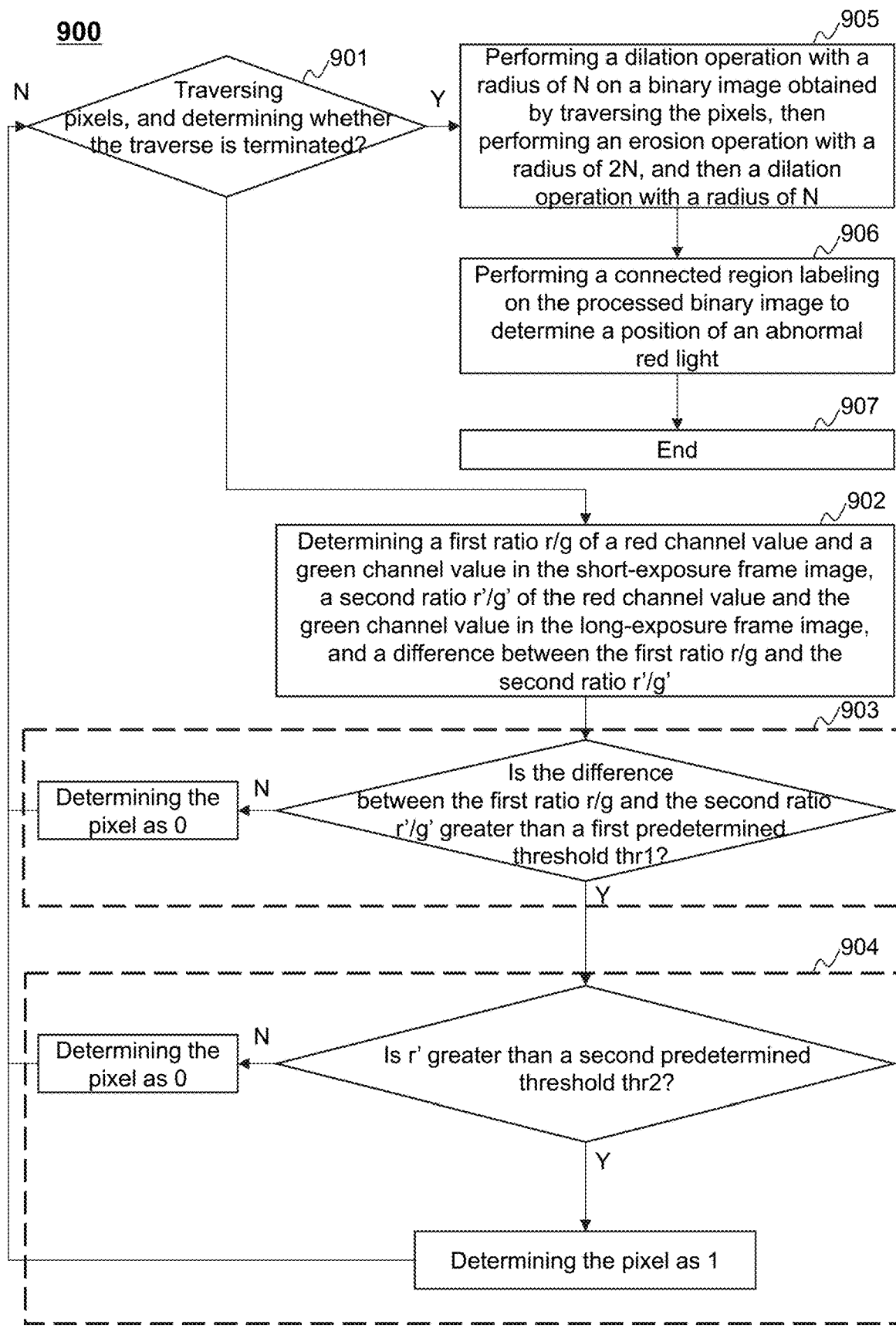
Figure 11:
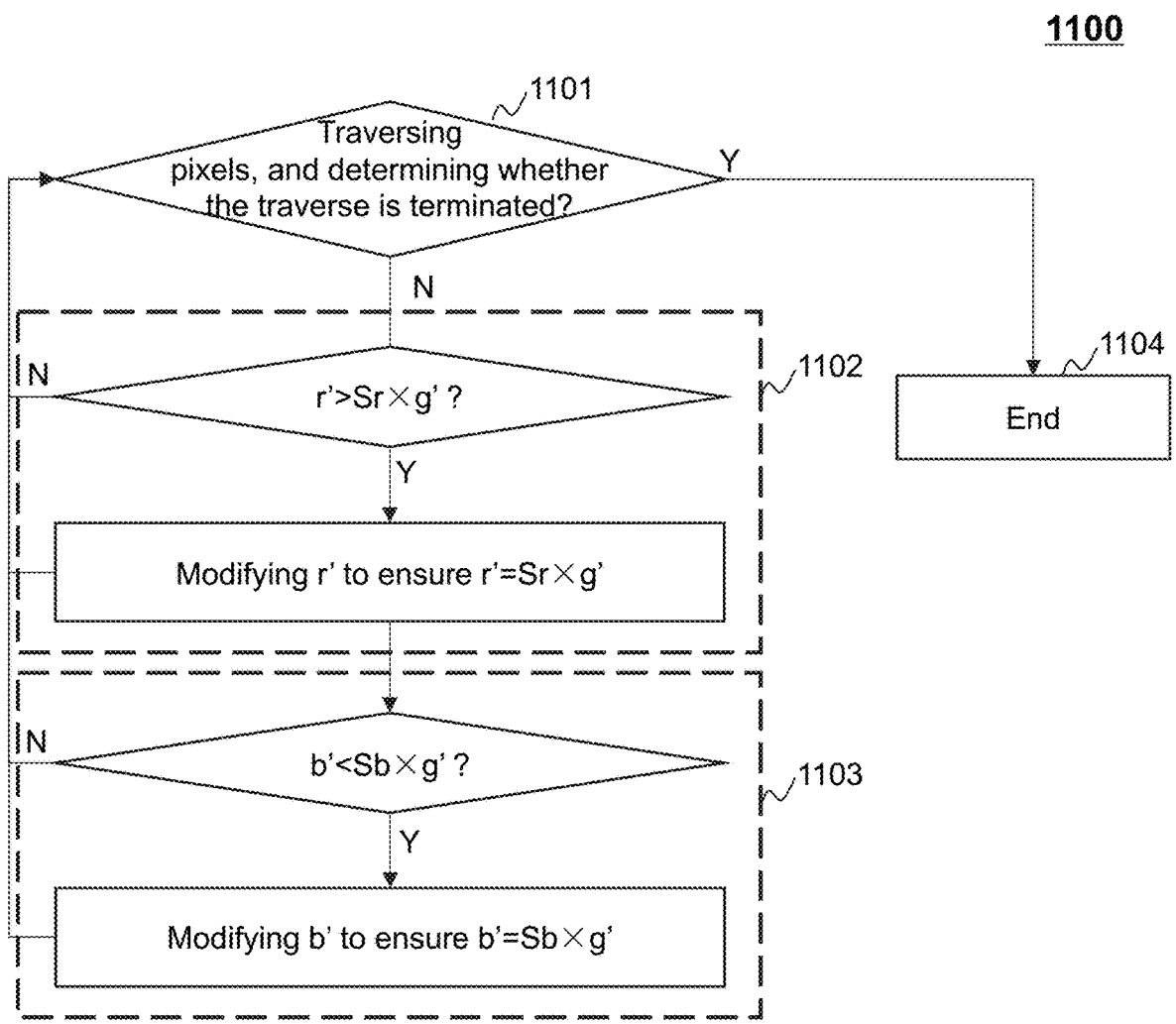
Figure 12:
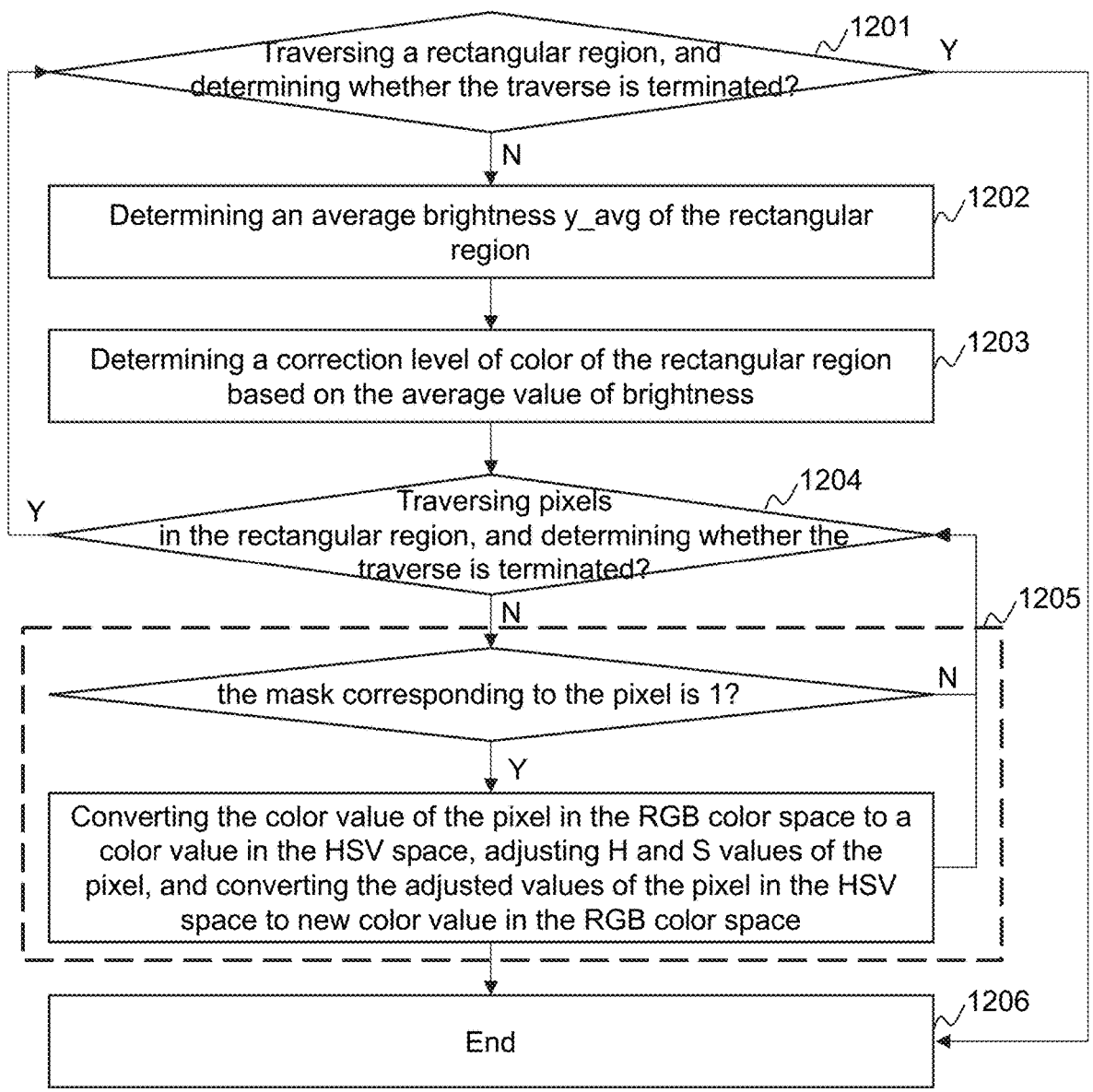
Figure 13:
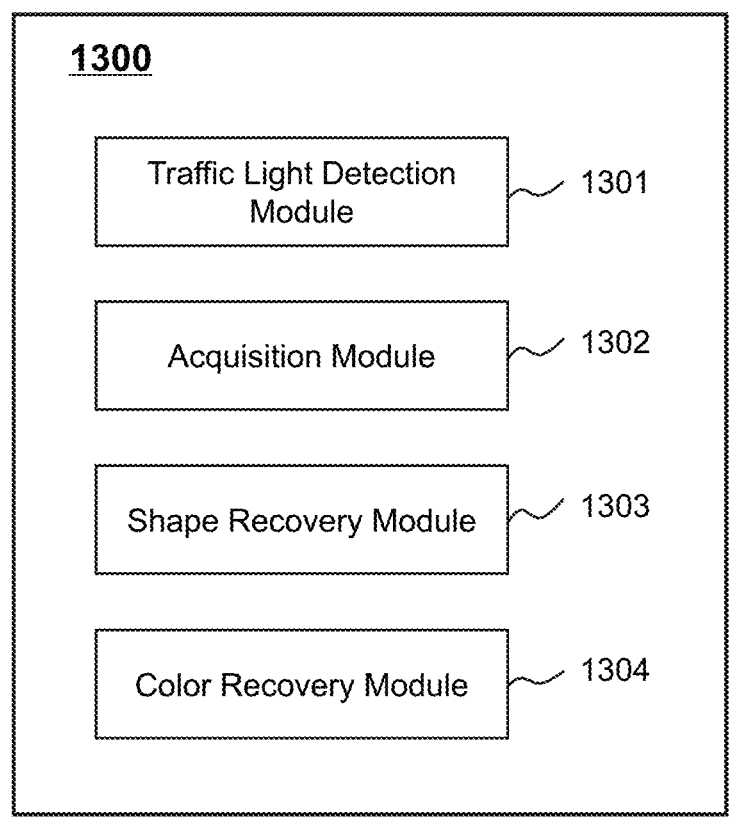
Figure 14:
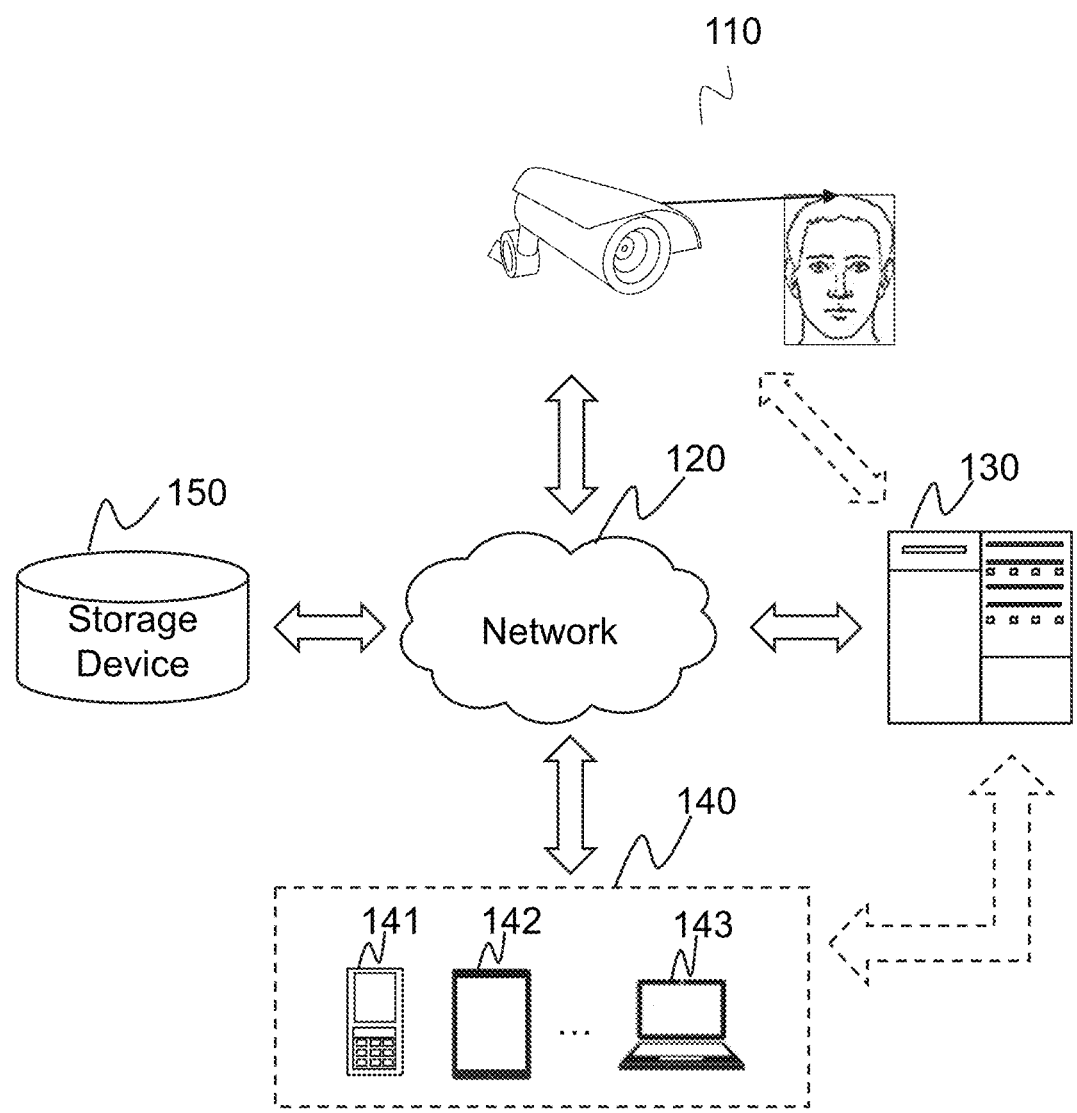

FIG. 5A, in connection with FIG. 5B, is a flowchart of an exemplary process for processing a captured image of a traffic light in a red light status according to some embodiments of the present disclosure;

FIG. 6 is a schematic diagram of an exemplary device for processing a captured image of a traffic light according to some embodiments of the present disclosure;

FIG. 7 is a schematic diagram of an exemplary computing device according to some embodiments of the present disclosure;

FIG. 8 is a flowchart of an exemplary process for processing an image of a traffic light according to some embodiments of the present disclosure;

FIG. 9 is a flowchart of an exemplary process for locating a region of an abnormal red light according to some embodiments of the present disclosure;

FIG. 10 is a flowchart of an exemplary process for generating a fusion mask according to some embodiments of the present disclosure;

FIG. 11 is a flowchart of an exemplary process for performing a halo reducing operation on a long-exposure frame image according to some embodiments of the present disclosure;

FIG. 12 is a flowchart of an exemplary process for recovering a color of the abnormal red light according to some embodiments of the present disclosure;

FIG. 13 is a schematic diagram of an exemplary device for processing an image of a traffic light according to some embodiments of the present disclosure; and FIG. 14 is a block diagram of an exemplary image processing system according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

An aspect of the present disclosure relates to processing an image including a scene of a light (e.g., a traffic light). For example, an aspect of the present disclosure is to process the image to determine whether a predefined light effect (e.g., abnormal light) exists in the image. The determining of whether the predefined light effect exists in the image may be based on a current light status of the light that is substantially correct with respect to the color of the light, which may improve the accuracy of the determination result. As another example, an aspect of the present disclosure is to adjust a shape and color of the light in a long-exposure frame including a scene of a light based on a short-exposure frame including the scene of the light, and the current light status of the light. To this end, an image processing device may first obtain a first image of a target scene under a long exposure time, wherein the target scene is clear but the traffic light is over exposed; obtain a second image of the target scene under a short exposure time, wherein the target scene is under exposed but the shape and color of the traffic light is correctly exposed; and adjust the appearance of the traffic light in the first image based on the appearance of the traffic light in the second image.

FIG. 14 is a block diagram of an exemplary image processing system according to some embodiments of the present disclosure. The image processing system 1400 may be configured for processing images, for example, determining whether a predefined light effect exists in an image, or, as another example, adjusting a light status in the image. As illustrated in FIG. 14, the image processing system may include a sensor 110, a network 120, a processor 130 (also referred to as a processing device), a terminal 140, and a storage device 150. The components of the image processing system 1400 may be connected to each other in one or more of various ways. Merely by way of example, the sensor 110 may be connected to the processor 130 via the network 120. As another example, the sensor 110 may be connected to the processor 130 directly. As a further example, the storage device 150 may be connected to the processor 130 directly or via the network 120. As still a further example, the terminal 140 may be connected to the processor 130 directly or via the network 120.

The sensor 110 may be configured to capture one or more images. As used in this application, an image may be a still image, a video, a stream video, or a video frame obtained from a video. The image may be a three-dimensional (3D) image or a two-dimensional (2D) image. The sensor 110 may be or may include a camera. In some embodiments, the sensor 110 may be a digital camera, a video camera, a security camera, a web camera, a smartphone, a tablet, a laptop, a video gaming console equipped with a web camera, a camera with multiple lenses, a camcorder, etc. In some embodiments, the sensor 110 (e.g., a camera) may capture an image of a scene including a light status. As used herein, a scene including a light status may also be referred to as a target scene. Exemplary light status may include at least one of a red light of the light, a green light of the light, or a yellow light of the light. For example, the sensor 110 may be an electronic police camera located in a crossroad, which is capable of monitoring and/or detecting vehicles passing through the crossroad. The electronic police camera may capture an image of a scene including a traffic light and/or a vehicle passing through the crossroad, based on which whether the vehicle violate transportation regulations may be determined.

The network 120 may facilitate exchange of information and/or data. In some embodiments, one or more components of the image processing system 100 (e.g., the sensor 110, the terminal 140, the processor 130, or the storage device 150) may send information and/or data to another component(s) in the image processing system 100 via the network 120. For example, the processor 130 may process an image obtained from the sensor 110 via the network 120. As another example, the processor 130 may obtain user instructions from the terminal 140 via the network 120. In some embodiments, the network 120 may be any type of wired or wireless network, or combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points through which one or more components of the image processing system 100 may be connected to the network 120 to exchange data and/or information.

In some embodiments, the processor 130 may process data obtained from the sensor 110, the terminal 140, or the storage device 150. The processor 130 may be a central processing unit (CPU), a digital signal processor (DSP), a system on a chip (SoC), a microcontroller unit (MCU), or the like, or any combination thereof. In some embodiments, the processor 130 may be a single server or a server group. The server group may be centralized or distributed. In some embodiments, the processor 130 may be local or remote. For example, the processor 130 may access information and/or data stored in the sensor 110, the terminal 140, and/or the storage device 150 via the network 120. As another example, the processor 130 may be directly connected to the sensor 110, the terminal 140, and/or the storage device 150, to access stored information and/or data. In some embodiments, the processor 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the processor 130 may be configured to process images. Merely by way of example, the processor 130 may obtain a first image of a target scene under a first exposure time and a second image of the target scene under a second exposure time. The target scene may include a light status. The light status may be at least one of a red light of a light, a yellow light of the light, or a green light of the light. The first exposure time may be longer than the second exposure time such that a color and a shape of the light status in the second image may be substantially correct, and at least one of the color or the shape of the light status in the first image may be substantially distorted.

The processor 130 may further generate a target image by adjusting the light status in the first image based on the light status in the second image. In some embodiments, the target scene may be in a first area of interest (AOI). The light status may be in the first AOI. In some embodiments, the processor 130 may adjust at least one of a shape or color of the light status in the first AOI of the first image based on the light status in the first AOI of the second image.

In some embodiments, to adjust the first image, the processor 130 may fuse the first AOI of the first image with the first AOI of the second image. Specifically, the processor 130 may determine a binary image based on the first image and the second image. The binary image may include a first binary value and a second binary value smaller than the first binary value. To determine the binary image, the processor 130 may determine a first ratio of a first color channel and a second color channel for each pixel in the second image, and determine a second ratio of the first color channel and the second color channel for each pixel in the first image. Upon determining that a difference between the first ratio of the second ratio is greater than a first threshold, and that the first color channel in the first image is greater than a second threshold, the processor 130 may assign the pixel with the first binary value. The first color may be the same as the color of the light status. The processor 130 may generate a fusion mask based on the binary image. The processor 130 may fuse the first AOI of the first image with the first AOI of the second image based on the generated fusion mask. In some embodiments, before the generating of the target image, the processor 130 may reduce a halo of the first image at least based on the first color channel of at least one pixel in the first image and the second color channel of at least one pixel in the first image.

Alternatively or additionally, the processor 130 may be also configured to determine whether a predefined light effect exists in the image. A predefined light effect may include an abnormal light. For different light statuses of the image, there may be different predefined light effects. For example, when the light status is a red light, the corresponding predefined light effect may be abnormal light presenting yellow or white, while when the light status is a green light, the corresponding predefined light effect may be an abnormal light presenting white.

In some embodiments, the processor 130 may determine whether the predesined light effect exists at least based on the obtained light status of the light in the image. Merely by way of example, the processor 130 may obtain a light status of a light, and obtain an image of the light in the light status. The light status may be at least one of a red light of a light, a yellow light of the light, or a green light of the light. The processor 130 may further determine whether a predefined light effect exists in the obtained image of the light.

In some embodiments, to determine whether the predefined light effect exists in the image, the processor 130 may extract a halo region and a highlight region in the obtained image based on the light status. To extract the halo region, the processor 130 may, for each pixel in the obtained image, determine the pixel to be in the halo region when the color of the pixel is within a first color range corresponding to the light status. For example, the processor 130 may determine a binary image corresponding to the obtained image by assigning at least one pixel in the obtained image with a first binary value or a second binary value according to whether the pixel is in the halo region. The processor 130 may erode the binary image to generate an eroded image, and further dilate the eroded image to extract the halo region. To extract the highlight region, the processor 130 may, for each pixel in the obtained image, determine the pixel to be in the highlight region when the color of the pixel is within a second color range corresponding to the light status and when the brightness of the pixel is greater than a threshold. For example, the processor 130 may determine a binary image corresponding to the obtained image by assigning at least one pixel in the obtained image with a first binary value or a second binary value according to whether the pixel is in the highlight region. The processor 130 may erode the binary image to generate an eroded image, and dilate the eroded image to extract the halo region. In some embodiments, the processor 130 may adjust at least one of the first color range corresponding to the halo region or a second color range corresponding to the highlight region based on an environmental lighting condition of the light. In some embodiments, before the extracting of the halo region and the highlight region, the processor 130 may determine a second area of interest (AOI) in the obtained image. The processor 130 may extracted the halo region and the highlight region in the second AOI.

Upon a determination that the halo region and the highlight region overlaps, the processor 130 may determine that the predefined light effect exists in the obtained image. In some embodiments, the halo region may include at least one first connected region, and the highlight region may include at least one second connected region. For each second connected region, the processor 130 may determine an overlapped region between the second connected region and the at least one first connected region. When a ratio of the overlapped region and the second connected region is greater than a threshold, the processor 130 may determine the second connected region to correspond to the predefined light effect.

The terminal 140 may include a mobile device 140-1, a tablet computer 140-2, a laptop computer 140-3, or the like, or any combination thereof. In some embodiments, the mobile device 140-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, the terminal 140 may remotely operate the sensor 110. In some embodiments, the terminal 140 may operate the sensor 110 via a wireless connection. In some embodiments, the terminal 140 may receive information and/or instructions inputted by a user, and send the received information and/or instructions to the sensor 110 or to the processor 130 via the network 120. In some embodiments, the terminal 140 may receive data and/or information from the processor 130. In some embodiments, the terminal 140 may be part of the processor 130. In some embodiments, the terminal 140 may be omitted.

The storage device 150 may store data and/or instructions. In some embodiments, the storage device 150 may store data obtained from the terminal 140 and/or the processor 130. In some embodiments, the storage device 150 may store data and/or instructions that the processor 130 may execute or use to perform exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the image processing system 100 (e.g., the terminal 140, the processor 130). One or more components of the image processing system 100 may access the data or instructions stored in the storage device 150 via the network 120. In some embodiments, the storage device 150 may be directly connected to or communicate with one or more components of the image processing system 100 (e.g., the terminal 140, the processor 130). In some embodiments, the storage device 150 may be part of the processor 130.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

The present application provides a method and device for processing a captured image of a traffic light. In some embodiments, the method may include acquiring a current light status (also referred to as a light status) of a traffic light, wherein the current light status may include at least one of a red light status (also referred to as a red light), a green light status (also referred to as a green light), or a yellow light status (also referred to as a yellow light). The method may also include extracting a halo region from the captured image of the traffic light in the current light status, and extracting a highlight region from the captured image. A color of the halo region may be within a first color range corresponding to a color of the traffic light in the current light status. A color of the highlight region may be within a second color range corresponding to color of an abnormal traffic light in the current light status, and the brightness of the highlight region may be greater than a threshold brightness. The method may further include determining an abnormal traffic light (also referred to as a predefined light effect) in the current light status of the traffic light in the captured image if an overlapped region between the halo region and the highlight region exists. In this way, compared with the prior art, the accuracy of detection may be improved by comprehensively determining whether the traffic light in the captured image is abnormal through the halo and brightness information. Also, the detection based on the current light status may implement abnormal traffic light detection in the captured image in real time, which may satisfy the capability of the intelligent transportation system to detect the abnormal traffic light in real-time. For example, whether the red light is abnormal may be detected when the current light status is red light status. As another example, whether the green light is abnormal may be detected when the current light status is green light status.

Hereinafter, the embodiments of the present application will be further described in detail with reference to the accompanying drawings.

First Embodiment

Figure 1:
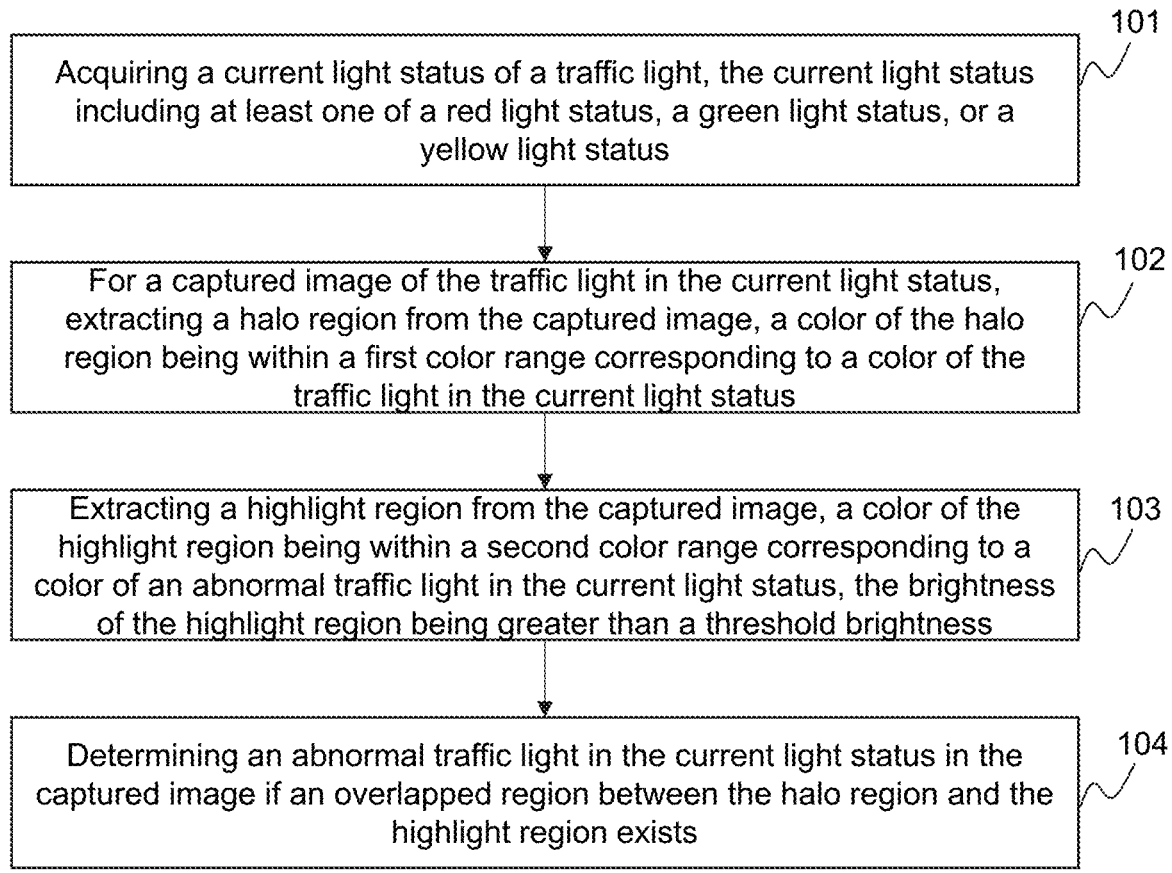
FIG. 1 is a flowchart illustrating an exemplary process for processing a captured image of a traffic light according to some embodiments of the present disclosure.

FIG. 1 is a flowchart illustrating an exemplary process for processing a captured image of a traffic light according to some embodiments of the present disclosure. The process may be executed by the the processor 130. For example, the processor 130 may access the storage device 150 and read a set of instructions for image processing stored therein, and then the processor 130 may execute the set of instruction to operate the process. The process may include the following operations.

The processor 130 may first obtain/receive the captured image including a scene and a traffic light. The processor 130 may obtain the image from the image capturing device, such as the sensor 110 (e.g., a camera).

In 101, a current light status (also referred to as a light status) of a traffic light may be acquired. The operation 101 may be executed by a processor (e.g., the processor 130). In some embodiments, the current light status may include at least one of a red light status (also referred to as a red light), a green light status (also referred to as a green light), or a yellow light status (also referred to as to a yellow light).

In 102, for the captured image of the traffic light in the current light status, a halo region may be extracted from the captured image (also referred to as the image). The operation 102 may be executed by the processor 130. A halo region in an image of a light (e.g., a traffic light) may refer to a region substantially introduced by the interaction of environmental lighting of the light and the camera which is used to capture the image of the light. In some embodiments, the halo region may substantially surround an region in the image which corresponds to the light. In some embodiments, a color of the halo region may be within a first color range corresponding to the current light status (e.g., a color of the traffic light in the current light status).

In 103, a highlight region may be extracted from the captured image. The operation 103 may be executed by the processor 130. A highlight region in an image of a light (e.g., a traffic light) may refer to a region substantially introduced by the interaction of rays emitted by the light and the camera which is used to capture the image of the light. In some embodiments, the highlight region may substantially correspond to the light. In some embodiments, a color of the highlight region may be within a second color range corresponding to the current light status (e.g., a color of an abnormal traffic light in the current light status of the traffic light). The brightness of the highlight region may be greater than a threshold brightness. In some embodiments, the order of operations 102 and 103 may not be intended to be limiting. For example, operation 102 may be executed before or after operation 103 by a processor (e.g., the processor 130). As another example, operation 102 and operation 103 may be executed simultaneously by a processor (e.g., the processor 130).

In 104, an abnormal traffic light (also referred to as a predefined light effect) in the current light status in the captured image may be determined if an overlapped region between the halo region and the highlight region exists. The operation 104 may be executed by the processor 130.

In some embodiments, through operations 101 to 103, the current light status of the traffic light may be acquired by a processor (e.g., the processor 130) in real time, the captured image in the current light status may be processed (e.g., based on the acquired current light status of the traffic light), by the processor (e.g., the processor 130), to extract the halo region and the highlight region, based on which whether an abnormal traffic light exists in the captured image may be determined by the processor (e.g., the processor 130). Therefore, on one hand, the present application may satisfy the requirement of the intelligent transportation system for real-time detection of abnormal traffic light(s). On the other hand, the accuracy of detection may be improved by comprehensively determining whether the traffic light in the captured image is abnormal through both the halo and brightness information.

To further understand the technical solution provided by the present application, the technical solution may be further described hereinafter.

A color may be represented by three parameters, i.e., brightness, hue and saturation. Color values of a halo of a traffic light may not be completely the same, but the hue of the halo may be substantially unchanged. For example, the halo of a red light may be still red while the degree of red may vary, that is, the color values of the halo may not be completely the same. Therefore, in order to improve the accuracy of determining the halo, the first color range of the red light status may be a predetermined range of red, and the first color range of the green light status may be a predetermined range of green.

Similarly, different traffic lights may have different color casts. For example, the color cast of the red light may be usually yellow or white, while the color cast of the green light may be usually white. Therefore, in order to improve the accuracy of determining the highlight region, the second color range of the red light status may be a first predetermined range of white or a first predetermined range of yellow, and the second color range of the green light status may be a second predetermined range of white. Highlight regions may be distinguished by certain color ranges by a processor (e.g., the processor 130), and the desired highlight region may be extracted by a processor (e.g., the processor 130) as much as possible.

In some embodiments, the captured image may include image contents irrelevant to the traffic light. The processing of the image contents may be inevitably inefficient and waste processing resources. Therefore, the process may further include acquiring a specified region from the captured image as a region of interest (ROI) (also referred to as a second area of interest (AOI)). The operation may be executed by the processor 130. In some embodiments, the positions of an image acquisition device and a traffic light may be relatively fixed. The specified region may be manually specified. For example, a coordinate position of the specified region may be manually set, by a user. As another example, a coordinate position of a rectangular region may be set by a processor (e.g., the processor 130), and a ROI may be acquired according to the coordinate position by the processor (e.g., the processor 130).

Figure 3:
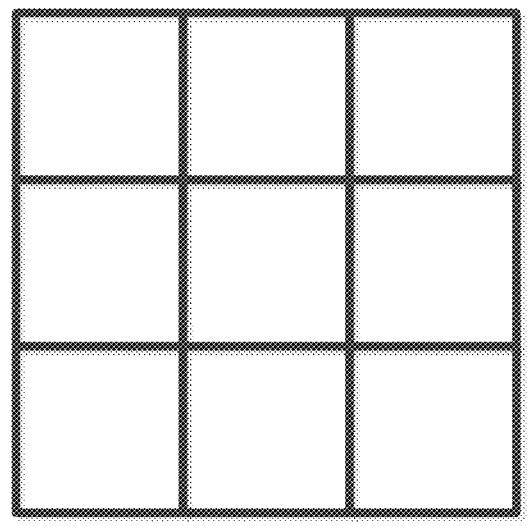
FIG. 3 is a schematic diagram of an exemplary erosion factor according to some embodiments of the present disclosure.

Thus, in the image processing process illustrated in FIG. 3, only the ROI (also referred to as the AOI) in the captured image may be processed by a processor (e.g., the processor 130). For example, the extracting of the halo region from the captured image may include extracting the halo region from the ROI. As another example, the extracting of the highlight region from the captured image may include extracting the highlight region from the ROI. The operations may be executed by the processor 130.

The extraction of the halo region and the highlight region may only involve processing the ROI without the need of processing the entire captured image, which may reduce the amount of processing data, improve efficiency, and save processing resources.

In some embodiments, as seen from the above description, the color of the halo region may be within the first color range corresponding to the color of the traffic light in the current light status. Therefore, in order to extract the halo region, whether a color of a pixel is within the first color range may be determined by a processor (e.g., the processor 130). In response to a determination that the color of the pixel is within the first color range, the processor 130 may determine the pixel belongs to the halo region. In some embodiments, to facilitate the description and determination of the first color range, and determine whether a pixel belongs to the halo region, the extracting of the halo region from the ROI may be performed by a processor (e.g., the processor 130) according to the following operations.

In A1, color values of pixels in the ROI (also referred to as AOI) may be converted to an Lab color space. The operation A1 may be executed by the processor 130.

In A2, for each pixel in the ROI, whether the color value of the pixel in the Lab color space is within the first color range corresponding to the color of the traffic light in the current light status may be determined. The operation A2 may be executed by the processor 130. In some embodiments, the first color range may be a color region obtained by linearly segmenting the Lab color space according to the color of the current light status.

Figure 2:
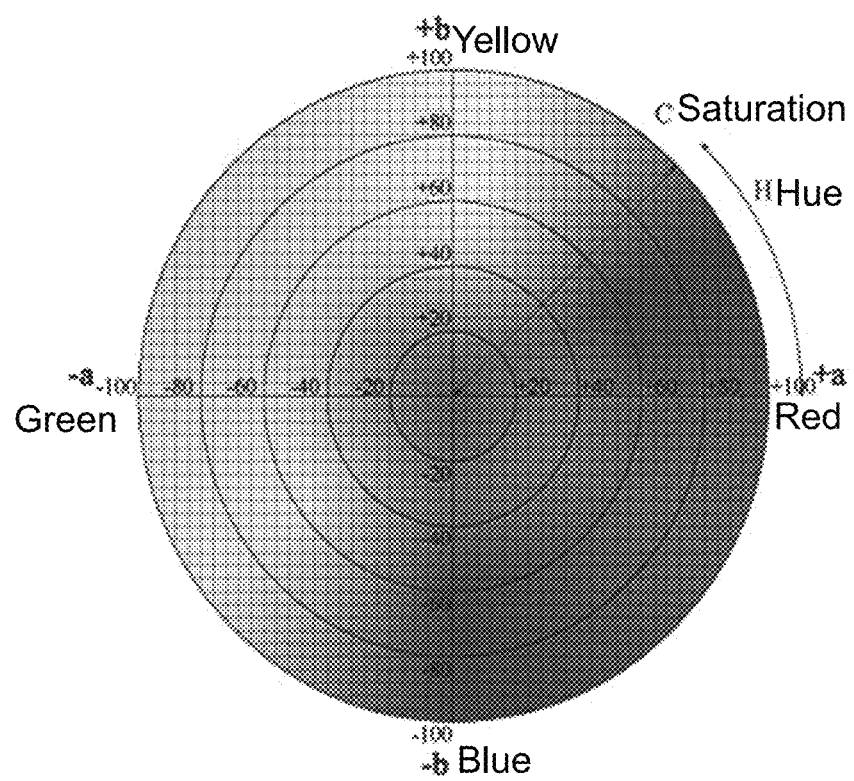
FIG. 2 is a schematic diagram of a red region obtained by linear segmentation according to some embodiments of the present disclosure.

An L component in the Lab color space may represent the brightness of a pixel, ranging from 0 to 100, which may represent a range from black to white. "a" may represent a range from red to green, ranging from 127 to −128. "b" may represent a range from yellow to blue, ranging from 127 to −128. In the Lab color space, a sector region may be linearly segmented to colors with the same hue by a processor (e.g., the processor 130). For example, FIG. 2 is a schematic diagram of a red region obtained by linear segmentation. The red region may be a sector region from a red coordinate axis +a to a line above the red coordinate axis +a (e.g., line c illustrated in FIG. 2). Assuming that a pixel has a color value of (L, a, b), whether the pixel is within the first color range may be determined according to Formula (1) by a processor (e.g., the processor 130). The pixel may be within the first color range, if the color value of (L, a, b) of the pixel satisfies conditions listed in Formula (1) as below:

$$\begin{cases} b < (\lambda_1 \times a) \\ b > (\lambda_2 \times a + \lambda_3) \\ L > \lambda_4, b > \lambda_5, a > \lambda_6 \end{cases} \quad (1)$$

wherein $\lambda_1$, $\lambda_2$, $\lambda_3$, $\lambda_4$, $\lambda_5$, and $\lambda_6$ may be all predetermined constants. In some embodiments, each of the predetermined constants may be determined according to specific conditions by a processor (e.g., the processor 130).

In A3, in response to a determination that the color value of the pixel in the Lab color space is within the first color range, the pixel may be determined as a point belonging to the halo region by a processor (e.g., the processor 130). That is, the processor 130 may determine the pixel to be in the halo region. Alternatively, in response to a determination that the color value of the pixel in the Lab color space is not within the first color range, the pixel may be determined as a point not belonging to the halo region by a processor (e.g., the processor 130). The operation A3 may be executed by the processor 130.

As can be seen from operations A1 to A3, the first color range (e.g., the first color range of red light status, the first color range of green light status) may be obtained from the Lab color space by linear segmentation. Due to the property of linear segmentation, whether a color of a pixel is within the first color range may be determined by a mathematical formula, which may improve the efficiency of extracting the halo region of a processor (e.g., the processor 130).

It should be noted that, the expressions of the first color range may vary due to different color spaces. In some embodiments, the first color range may be determined according to a specific color space by a processor (e.g., the processor 130), which may be applicable to the present application.

Further, the halo region extracted according to operations A1 to A3 may have noise, and the extracted region (or the halo region) may not be connected and may have voids. In the present application, in order to overcome the above problems and improve the accuracy of the extracted halo region, one or more operations may be performed by a processor (e.g., the processor 130).

In B1, the ROI may be binarized. The operation B1 may be executed by the processor 130. The pixels belonging to the halo region may be assigned with a first binary value, and the pixels not belonging to the halo region may be assigned with a second binary value. For example, the pixels belonging to the halo region may be set as 255 by the processor 130, and the pixels not belonging to the halo region may be set as 0 by the processor 130. Thus, a binary image of the halo region may be determined.

In B2, noise may be removed from the binarized ROI (also referred to as the binary image) by performing a first erosion operation. The operation B2 may be executed by the processor 130.

In B3, the halo region may be determined by performing a first dilation operation on the de-noised ROI (also referred to as a first eroded image). The operation B3 may be executed by the processor 130.

In some embodiments, in the first erosion operation, the size of an erosion factor may be set as needed by the processor 130, and may not be limited in the present application. Similarly, in the first dilation operation, the size of a dilation factor may be set as needed by the processor 130, and may not be limited in the present application. For example, as shown in FIG. 3, the erosion factor may be a rectangle having a radius of N (N may be the number of pixels). For example, N may be 1 in FIG. 3, and the surrounding pixels in the erosion factor may be one pixel away from the pixel in center. In the present application, a dilation factor with a larger range may be used by the processor 130 to close some incompletely closed multi-connected regions, and generally 2N may be used by the processor 130 as the dilation factor. In some embodiments, halo points of the red light may be few, but the dilation factor with a larger range may connect the halo points.

In some embodiments, in order to facilitate the extracting of an accurate highlight region, the extracting of the highlight region from the ROI may be performed by the processor 130 according to the following operations.

In C1, for each pixel in the ROI, whether the pixel satisfies one or more conditions may be determined. The operation C1 may be executed by the processor 130. The condition(s) may include the brightness being greater than a threshold brightness, and the color value of the pixel in a RGB color space being within the second color range corresponding to the color of the abnormal traffic light in the current light status.

In C2, in response to a determination that the pixel satisfies the one or more conditions, the processor 130 may determine the pixel to be in the highlight region. The pixel may be assigned with a first binary value. For example, the pixel may be set as 255. The operation C2 may be executed by the processor 130.

In C3, in response to a determination that the pixel doesn't satisfy the one or more conditions, the pixel may be assigned with a second binary value. For example, the pixel may be set as 0. The operation C3 may be executed by the processor 130. Thus, a binary image may be determined.

In C4, noise may be removed from the ROI by performing a second erosion operation. The operation C4 may be executed by the processor 130.

In C5, the highlight region may be determined by performing a second dilation operation on the ROI (also referred to as a second eroded image) after the second erosion operation. The operation C5 may be executed by the processor 130.

Similarly, in the extraction of the highlight region, the binarized highlight region may also include noise and voids. The problems (e.g., the noise and the voids) may be overcome by performing operations C4 and C5, which may make the extracted highlight region more accurate. The shapes and sizes of an erosion factor of the second erosion operation and a dilation factor of the second dilation operation may be set as needed by the processor 130, and may not be limited in the present application.

Thus, the highlight region may be accurately extracted by using a simple and efficient process via operations C1 to C5.

As for operation C1, in the present application, the processing of the pixels in the RGB color space may be merely for convenience. On one hand, many captured images may use the RGB color space to represent the colors of pixels, and thus, color space conversion may not be required. Further, according to the imaging principle of imaging media (e.g., a charge-coupled device (CCD)), for a red light, when the imaging medium responds to the red light, the red component may first reach saturation before the green component and the blue component, which results in the largest red component value, followed by the green component value, and the smallest blue component value. Thus, whether a color value is within the second color range may be determined by comparing the magnitudes by the processor 130, which may be conveniently and effectively implemented. Specifically, color thresholds corresponding to respective color components of red, green and blue may be set by the processor 130. Taking the red light as an example, if a pixel has a red component value greater than the color threshold of the red component, a green component value greater than the color threshold of the green component and a blue component value smaller than the color threshold of the blue component, the color value of this pixel may be within the second color range.

As for the determination of the brightness in operation C1, the RGB image may be converted to a gray-scale image by the processor 130. For each pixel, in response to a determination that a gray-scale value of the pixel is greater than a specified gray-scale value, the brightness of the pixel may be greater than the threshold brightness. Alternatively, in response to a determination that the gray-scale of the pixel is not greater than the specified gray-scale value, the brightness of the pixel may not be greater than the threshold brightness.

Further, in some embodiments, after the RGB image is converted to the gray-scale image, in order to improve the accuracy of the determination, a suitable specified gray-scale value may be determined for the gray-scale image by the processor 130 using a filtering method.

It should be noted that in some embodiments, there are many other ways to represent brightness, which may be used as needed. For example, the color values of the captured image (e.g., of the pixels in the captured image) may be converted to other color space with brightness information to determine whether the brightness is greater than the threshold brightness. In addition, the captured image may satisfy the additive color principle, that is, the greater a sum of R, G, and B values is, the greater the brightness is. In some embodiments, the sum of R, G, and B values may be by the processor 130 used to represent brightness, and whether the brightness is greater than the threshold brightness may be determined by the processor 130.

Of course, in some embodiments, environmental factors of the traffic light may influence the color value of the captured image. For example, in the case of darkness such as night and rainy days, the captured image may be acquired by increasing exposure, which may influence the accuracy of extracting the highlight region in the present application. Therefore, in order to adapt to various environmental factors and extract the highlight region more accurately, before determining whether the pixel satisfies the conditions in operation C1, one or more operations may be performed by the processor 130.

In D1, a current scenario corresponding to the current light status may be determined according to environmental factors (also referred to as environmental lighting condition) in which the traffic light is. The operation D1 may be executed by the processor 130. The environmental factors may include at least one of weather conditions, exposure for acquiring the captured image, and intensities of ambient lights.

The weather conditions may include, for example, dark nights, cloudy daytime, rainy daytime, snowy daytime, and sunny daytime with good light.

The exposure may also reflect the intensities of ambient lights, and thus the intensities of the ambient lights may also be represented by the exposure.

It should be noted that, other environmental factors that can reflect the exposure may also be applicable to the present application, and may not be limited in the present application.

In D2, according to a relationship of preset scenarios and color ranges, a color range corresponding to the current scenario may be determined by the processor 130 as a second color range corresponding to a color of an abnormal traffic light in the current light status. The operation D2 may be executed by the processor 130.

By configuring different second color ranges for different scenarios, the highlight region for different scenarios may be effectively extracted by the processor 130 such that the accuracy of extracting the highlight region may be improved and a good foundation may be laid for determining the abnormal traffic light.

Further, in order to extract the highlight region accurately, each scenario may correspond to a set of color thresholds. Each set of color thresholds may include a red threshold, a green threshold and a blue threshold.

For each scenario, the second color range of the red light status may include a red R value being greater than a red threshold of the red light status, a green G value being greater than a green threshold of the red light status and a blue B value being smaller than a blue threshold of the red light status. Thus, the color cast corresponding to the red light may include yellow and white, and the color cast may be detected by the processor 130 accurately.

For each scenario, the second color range of the green light status may include a red R value being greater than a red threshold of the green light status, a green G value being greater than a green threshold of the green light status and a blue B value being smaller than a blue threshold of the green light status. The greatest difference of the R, G and B values may be smaller or equal to a predetermined difference. Since the color cast of the green light may be usually white, the color cast of white can be processed by setting the greatest difference of the R, G and B values being smaller or equal to the predetermined difference.

In some embodiments, in order to facilitate locating the position of the abnormal traffic light accurately, one or more operations may be performed, for example, by the processor 130. Specifically, the processor 130 may label the ROI after the first dilation operation according to a connected region labeling algorithm to obtain the halo region consisting of at least one first connected region with a label. The processor 130 may also label the ROI after the second dilation operation according to the connected region labeling algorithm to obtain the highlight region consisting of at least one second connected region with a label. Thus, each position may be represented by the label of the connected region. The connected region labeling algorithm may be implemented by the processor 130 by using a prior art algorithm, for example, a pixel labeling algorithm, a line labeling algorithm, and a regional growth algorithm.

After the label of each connected region (e.g., the first connected regions, the second connected regions) is determined, the processor 130 may determine that an abnormal traffic light in the current light status exists in the captured image if there is an overlapped region between the halo region and the highlight region. The determination may be performed by the processor 130 according to the following operations.

In E1, for each second connected region, whether a first connected region which overlaps with the second connected region exists may be determined by the processor 130. The operation E1 may be executed by the processor 130.

In E2, in response to a determination that the first connected region which overlaps with the second connected region doesn't exist, the processor 130 may determine that the abnormal traffic light doesn't exist in the second connected region. In response to a determination that the first connected region which overlaps with the second connected region exists, the processor 130 may determine a proportion (also referred to as a ratio) of an overlapped portion of the second connected region and the first connected region to the second connected region.

Figure 4:
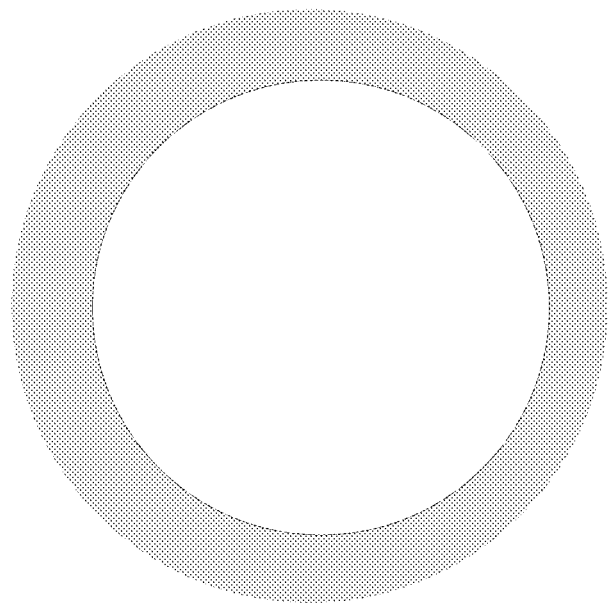
FIG. 4 is a schematic diagram of an image including a highlight region and a halo region according to some embodiments of the present disclosure.

Generally, when the color cast of the traffic light occurs, the halo region may enclose the highlight region. As shown in FIG. 4, white may represent the highlight region and gray may represent the halo region. When the halo region encloses the highlight region, the two will inevitably overlap, and the overlapping rate may be almost 100% for the highlight region. Therefore, for each second connected region (i.e., each independent highlight region), whether a halo region enclosing the second connected region exists may be determined by performing operations D1 to D2 by the processor 130. A predetermined proportion may be set by the processor 130 as needed, and may not be limited in the present application.

In E3, if the proportion is greater than the predetermined proportion, the second connected region may be determined by the processor 130 as the position of the abnormal traffic light, and the label of the second connected region may be taken as a label of the position of the abnormal traffic light by the processor 130. The operation E3 may be executed by the processor 130.

It should be noted that, for the detection of abnormality of the yellow light in the yellow light status, a first color range and a second color range corresponding to the yellow light may be set by the processor 130 according to the color cast of the yellow light. The extraction of a halo region and a highlight region and the determination principle of the abnormal traffic light may be similar to those of the red light and the green light. In some embodiments, one or more settings may be made by the processor 130 as needed and may not be described in the present application.

Hereinafter, in order to facilitate a comprehensive understanding of the technical solution provided by the embodiments of the present application, the following embodiments may take the detection of a red light as an example to illustrate a process of processing a captured image of a traffic light. FIG. 5A, in connection with FIG. 5B is a flowchart of an exemplary process 500 for processing a captured image of a traffic light in a red light status. The process 500 may be performed by the processor 130 according to one or more operations. In some embodiments, the processor 130 may perform the operations illustrated in FIG. 5B after performing the operations illustrated in FIG. 5A.

In 501, a red light status of a traffic light may be acquired in real time. The operation 501 may be executed by the processor 130.

In 502, for a captured image of the traffic light in the red light status, a specified region may be acquired from the captured image as a ROI (also referred to as an AOI). The operation 502 may be executed by the processor 130.

After operation 502 is performed, a halo region and a highlight region may be extracted from the ROI by the processor 130. The extraction of the halo region and the extraction of the highlight region may be performed simultaneously (e.g., the operations as illustrated in FIGS. 5A and 5B) by the processor 130. In some embodiments, the extraction may be performed sequentially by the processor 130. For example, the extraction of the highlight region may be first performed by the processor 130 and the extraction of the halo region may be then performed by the processor 130. Alternatively, the extraction of the halo region may be first performed by the processor 130 and the extraction of the halo region may be then performed by the processor 130.

(1) The extraction of the halo region may include operations 503 to 510.

In 503, the color values of pixels in the ROI may be converted to an Lab color space. The operation 503 may be executed by the processor 130.

In 504, for each pixel in the ROI, whether the color value of the pixel in the Lab color space is within a first color range corresponding to a color of the traffic light in the red light status may be determined. The operation 504 may be executed by the processor 130. The first color range may be a color region obtained by linearly segmenting the Lab color space according to the color of the red light status. In response to a determination that the color value of the pixel in the Lab color space is not within the first color range, the process may proceed to 505. In response to a determination that the color value of the pixel in the Lab color space is within the first color range, the process may proceed to 506. The first color range may be determined by the processor 130 according to Formula (1) described elsewhere in the present disclosure.

In 505, the pixel may be determined as a point not belonging to the halo region. The operation 505 may be executed by the processor 130.

Step 506, the pixel may be determined as a point belonging to the halo region. The operation 506 may be executed by the processor 130. That is, the processor 130 may determine the pixel to be in the halo region.

In 507, the ROI may be binarized. The operation 507 may be executed by the processor 130. The processor 130 may assign the pixels belonging to the halo region with a first binary value. For example, the processor 130 may set the pixels belonging to the halo region as 255. The processor 130 may assign the pixels not belonging to the halo region with a second binary value. For example, the processor 130 may set the pixels not belonging to the halo region as 0. In some embodiments, the pixel may be directly set as 0 by the processor 130 in 505, and the pixel may be directly set as by the processor 130 255 in 506, that is, the binarization operation may be implemented in operations 505 and 506 by the processor 130.

In 508, noise may be removed from the binarized ROI (also referred to as the binary image) by performing a first erosion operation. The operation 508 may be executed by the processor 130.

In 509, the halo region may be determined by performing a first dilation operation on the de-noised ROI. The operation 509 may be executed by the processor 130.

In 510, the ROI after the first dilation operation (i.e., the halo region determined in 509) may be labeled according to a connected region labeling algorithm to determine a halo region consisting of at least one first connected region with a label. The operation 510 may be executed by the processor 130.

(2) The extraction of the highlight region may include operations 511 to 516.

In 511, for each pixel in the ROI, whether the pixel satisfies one or more conditions may be determined. The operation 511 may be executed by the processor 130. The condition(s) may include the brightness being greater than a specified brightness, and the color value of the pixel in a RGB color space being within a second color range corresponding to a color of an abnormal traffic light in the red light status. In response to a determination that the pixel satisfies the one or more conditions, the processor 130 may determine the pixel to be in the highlight region, and the process may proceed to 512. In response to a determination that the pixel doesn't satisfy the one or more conditions, the process may proceed to 513.

In 512, the pixel may be set as a first binary value (e.g., 255). The operation 512 may be executed by the processor 130.

In 513, the pixel may be set as a second binary value (e.g., 0). The operation 513 may be executed by the processor 130. The binarization of the extracted highlight region may be implemented by operations 512 and 513.

In 514, noise may be removed from the binarized ROI (also referred to as the binary image) by performing a second erosion operation. The operation 514 may be executed by the processor 130.

In 515, the highlight region may be determined by performing a second dilation operation on the ROI after the second erosion operation (i.e., the de-noised ROI). The operation 515 may be executed by the processor 130.

In 516, the ROI after the second dilation operation (i.e., the highlight region determined in 515) may be labeled according to the connected region labeling algorithm to determine a highlight region consisting of at least one second connected region with a label. The operation 516 may be executed by the processor 130.

(3) After extracting the highlight region and the halo region, a position of the abnormal traffic light (also referred to as the predefined light effect) may be determined by the processor 130 according to operations 517 to 520.

In 517, for each second connected region, whether a first connected region which overlaps with the second connected region exists may be determined. The operation 517 may be executed by the processor 130. In response to a determination that the first connected region which overlaps with the second connected region doesn't exist, the process may proceed to 518. In response to a determination that the first connected region which overlaps with the second connected region (also referred to as an overlapped region) exists, the process may proceed to 519.

In 518, that the abnormal traffic light doesn't exist in the second connected region may be determined. The operation 518 may be executed by the processor 130.

In 519, a proportion (also referred to as a ratio) of an overlapped portion of the second connected region and the first connected region to the second connected region may be determined. The operation 519 may be executed by the processor 130.

In 520, if the proportion is greater than a predetermined proportion, the second connected region may be determined as the position of the abnormal traffic light, and the label of the second connected region may be taken as a label of the position of the abnormal traffic light. The operation 520 may be executed by the processor 130.

Second Embodiment

Based on the same inventive concept, the present application may further provide a device for processing a captured image of a traffic light. FIG. 6 is a schematic diagram of the device. The device may include a traffic light status acquisition module 601, a halo extraction module 602, a highlight region extraction module 603, and an abnormity determination module 604.

The traffic light status acquisition module 601 may be configured to acquire a current light status (also referred to as a light status) of a traffic light. In some embodiments, the current light status may include one of a red light status (also referred to as a red light), a green light status (also referred to as a green light), and a yellow light status (also referred to as a yellow light).

The halo extraction module 602 may be configured to extract a halo region from a captured image of the traffic light in the current light status. In some embodiments, the color of the halo region may be within a first color range corresponding to the current light status (e.g., a color of the traffic light in the current light status).

The highlight region extraction module 603 may be configured to extract a highlight region from the captured image. In some embodiments, the color of the highlight region may be within a second color range corresponding to the current light status (e.g., a color of an abnormal traffic light in the current light status of the traffic light). The brightness of the highlight region may be greater than a threshold brightness.

The abnormity determination module 604 may be configured to determine an abnormal traffic light (also referred to as a predefined light effect) in the current light status in the captured image if an overlapped region between the halo region and the highlight region exists.

In some embodiments, the first color range of the red light status may be a predetermined range of red, and the first color range of the green light status may be a predetermined range of green.

The second color range of the red light status may be a first predetermined range of white or a first predetermined range of yellow, and the second color range of the green light status may be a second predetermined range of white.

In some embodiments, the device may further include a ROI acquisition module.

The ROI acquisition module may be configured to acquire a specified region from the captured image as a ROI (also referred to as an AOI).

The halo extraction module 602 may be configured to extract the halo region from the ROI.

The highlight region extraction module 603 may be configured to extract the highlight region from the ROI.

In some embodiments, the halo extraction module 602 may include a color conversion unit, a first color range determination unit, and a halo determination unit.

The color conversion unit may be configured to convert the color values of pixels in the ROI to an Lab color space.

The first color range determination unit may be configured to, for each pixel in the ROI, determine whether the color value of the pixel in the Lab color space is within the first color range corresponding to the color of the traffic light in the current light status. The first color range may be a color region obtained by linearly segmenting the Lab color space according to the color of the current light status.

The halo determination unit may be configured to, in response to a determination that the color value of the pixel in the Lab color space is within the first color range, determine the pixel as a point belonging to the halo region. The halo determination may be also configured to, in response to a determination that the color value of the pixel in the Lab color space is not within the first color range, determine the pixel as a point not belonging to the halo region.

In some embodiments, the device may further include a binarization module, an erosion module, and a halo optimization module.

The binarization module may be configured to binarize the ROI. The binarization module may assign the pixel belonging to the halo region with a first binary value (e.g., 255) and the pixel not belonging to the halo region with a second binary value (e.g., 0).

The erosion module may be configured to remove noise from the binarized ROI by performing a first erosion operation.

The halo optimization module may be configured to determine the halo region by perform a first dilation operation on the de-noised ROI (also referred to as a first eroded image).

In some embodiments, the highlight region extraction module 603 may include a second color range determination unit, a first binarization unit, a second binarization unit, an erosion unit, and a highlight region determination unit.

The second color range determination unit may be configured to, for each pixel in the ROI, determine whether the pixel satisfies one or more conditions. The condition(s) may include the brightness being greater than a threshold brightness, and the color value of the pixel in a RGB color space being within the second color range corresponding to the color of an abnormal traffic light in the current light status.

The first binarization unit may be configured to, in response to a determination that the pixel satisfies the one or more conditions, assign the pixel with a first binary value. For example, the first binarization unit may set the pixel as 255.

The second binarization unit may be configured to, in response to a determination that the pixel doesn't satisfy the one or more conditions, assign the pixel with a second binary value. For example, the second binarization unit may set the pixel as 0.

The erosion unit may be configured to remove noise from the ROI by performing a second erosion operation.

The highlight region determination unit may be configured to determine the highlight region by perform a second dilation operation on the ROI after the second erosion operation (also referred to as the second eroded image).

In some embodiments, the device may further include a first region labeling module, and a second region labeling module.

The first region labeling module may be configured to label the ROI after the first dilation operation according to a connected region labeling algorithm to determine the halo region consisting of at least one first connected region with a label.

The second region labeling module may be configured to label the ROI after the second dilation operation according to the connected region labeling algorithm to determine the highlight region consisting of at least one second connected region with a label.

The abnormity determination module 604 may include an overlapping determination unit, a normality determination unit, a calculation unit, and an abnormity determination unit.

The overlapping determination unit may be configured to, for each second connected region, determine whether a first connected region which overlaps with the second connected region exists.

The normality determination unit may be configured to, in response to a determination that the first connected region which overlaps with the second connected region doesn't exist, determine that the abnormal traffic light does not exist in the second connected region.

The calculation unit may be configured to, in response to a determination that the first connected region which overlaps with the second connected region exists, determine a proportion (also referred to as a ratio) of an overlapped portion of the second connected region and the first connected region to the second connected region.

The abnormity determination unit may be configured to determine the second connected region as the position of the abnormal traffic light and taking the label of the second connected region as a label of the position of abnormal traffic light if the proportion is greater than a predetermined proportion.

In some embodiments, the device may further include a current scenario determination module, and a second color range determination unit.

The current scenario determination module may be configured to, before the second color range determination unit determines whether the pixel in the RGB color space satisfies the one or more conditions, determine a current scenario corresponding to the current light status according to environmental factors (also referred to as environmental lighting conditions) in which the traffic light is. The environmental factors may include at least one of weather conditions, exposure for acquiring the captured image, and intensities of ambient lights.

The second color range determination unit may be configured to, according to a relationship of preset scenarios and color ranges, determine a color range corresponding to the current scenario as a second color range corresponding to a color of an abnormal traffic light in the current light status.

In some embodiments, each scenario may correspond a set of color thresholds, and each set of color thresholds may include a red threshold, a green threshold and a blue threshold.

For each scenario, the second color range of the red light status may include a red R value being greater than a red threshold of the red light status, a green G value being greater than a green threshold of the red light status and a blue B value being smaller than a blue threshold of the red light status.

For each scenario, the second color range of the green light status may include a red R value being greater than a red threshold of the green light status, a green G value being greater than a green threshold of the green light status, and a blue B value being smaller than a blue threshold of the green light status. The greatest difference of the R, G and B values may be smaller than or equal to a predetermined difference.

In the device provided by some embodiments of the present application, the device may perform the following operations. A current light status (also referred to as light status) of a traffic light may be acquired by the processor 130. The current light status may include one of a red light status (also referred to as a red light), a green light status (also referred to as a green light), and a yellow light status (also referred to as a yellow light). A halo region may be extracted from a captured image of the traffic light in the current light status by the processor 130. A color of the halo region may be within a first color range corresponding to a color of the traffic light in the current light status. A highlight region may be extracted from the captured image by the processor 130. A color of the highlight region may be within a second color range corresponding to a color of an abnormal traffic light in the current light status by the processor 130. The brightness of the highlight region may be greater than a threshold brightness. An abnormal traffic light (also referred to as a predefined light effect) in the current light status in the captured image may be determined if an overlapped region between the halo region and the highlight region exists. In this way, compared with the prior art, the accuracy of detection may be improved by comprehensively determining whether the traffic light in the captured image is abnormal through the halo and brightness information. Further, the detection based on the current light status may implement abnormal traffic light detection in the captured image in real time, which may satisfy the real-time capability of the intelligent transportation system to detect the abnormal traffic light. For example, whether the red light is abnormal may be detected by the processor 130 when the current light status is red light status. As another example, whether the green light is abnormal may be detected by the processor 130 when the current light status is green light status.

Third Embodiment

Some embodiments of the present application further provide a computing device. The computing device may include a desktop computer, a laptop, a smartphone, a tablet, a personal digital assistants (PDA), etc. As shown in FIG. 7, the computing device may include a center processing unit (CPU) 701, a storage 702, an input device 703, an output device 704, etc. The input device 703 may include a keyboard, a mouse, a touch screen, etc. The output device 704 may include a display device, such as a liquid crystal display (LCD), a cathode ray tube (CRT), etc.

The storage 702 may include a read-only memory (ROM) and a random access memory (RAM), and provide a processor (e.g., the CPU 701) with program instructions and data stored in the storage. In the present application, the storage may be configured to store program instructions for the process for processing the captured image of the traffic light.

The processor (e.g., the CPU 701) may invoke the program instructions stored in the storage and perform the following operations according to the acquired program instructions. The processor may acquire a current light status of a traffic light. The current light status may include one of a red light status, a green light status, and a yellow light status. The processor may extract a halo region from a captured image of the traffic light in the current light status, and extract a highlight region from the captured image. A color of the halo region may be within a first color range corresponding to a color of the traffic light in the current light status. A color of the highlight region may be within a second color range corresponding to a color of an abnormal traffic light in the current light status. The brightness of the highlight region may be greater than a specified brightness. The processor may determine an abnormal traffic light in the current light status in the captured image if an overlapped region between the halo region and the highlight region exists.

Fourth Embodiment

A fourth embodiment of the present application provides a computer storage medium. The computer storage medium may be configured to store the computer program instructions used for the computing device, and include programs for executing the process for processing the captured image of the traffic light.

The computer storage medium may be any available medium or data storage device that a computer can access to, including but not limited to a magnetic memory (e.g., floppy disks, a hard disk, a magnetic tape, and a magneto optical disk (MO)), an optical memory (e.g., compact disc (CD), digital video disk (DVD), blue-ray disc (BD), and high-definition versatile disc (HVD)), and a semiconductor memory (e.g., read only memory (ROM), erasable programmable ROM (EPROM), electrically erasable programmable ROM (EEPROM), a non-volatile memory (NAND) FLASH), and solid state drive (SSD)), etc.

It should be noted that, the above embodiments are only used to illustrate the technical solutions of the present application, rather than limiting. Although the present application has been described in detail with reference to the foregoing embodiments, those skilled in the art should understand that it is still possible to modify the technical solutions described in the foregoing embodiments or equivalently substitute some of the technical features. However, these modifications or substitutions will not depart from the spirit and scope of the technical solutions of the embodiments of the present application.

FIG. 8 is a flowchart of an exemplary process for processing an image of a traffic light according to some embodiments of the present disclosure. The process may include the following operations.

In 801, a current light status (also referred to as a light status) of a traffic light may be determined. The operation 801 may be executed by a processor (e.g., the processor 130). The light status may consists at least part of a target scene illustrated elsewhere in the present disclosure. In some embodiments, the current light status may include a red light status (also referred to as a red light), a green light status (also referred to as a green light), and a yellow light status (also referred to as a yellow light).

In 802, a long-exposure frame image (also referred to as a first image corresponding to a first exposure time) and a short-exposure frame image (also referred to as a second image corresponding to a second exposure time) in the current light status may be acquired. The operation 802 may be executed by the processor 130.

In 803, a shape of the traffic light may be recovered based on regions of the traffic light in the long-exposure frame image and the short-exposure frame image in the current light status, to determine a shape recovery image of the traffic light. The operation 803 may be executed by the processor 130.

In 804, a color of the traffic light in the shape recovery image may be recovered according to the current light status. The operation 804 may be executed by the processor 130. Thus, a target image may be determined.

Some embodiments of the present application provide the process for processing the image of the traffic light. The process may be executed by the processor 130. According to the process, the long-exposure frame image and the short-exposure frame image in the current light status may be acquired, the shape of the traffic light may be recovered according to the regions of the traffic light in the long-exposure frame image and the short-exposure frame image, and the color of the traffic light may be also recovered. Thus, according to the process, not only the color of the traffic light may be recovered, but also the shape of the traffic light may be recovered, which may make the recovery of the traffic light more accurate. What's more, according to the process, before recovering the shape and/or the color of the traffic light, the processor 130 may determine the current light status of the traffic light, which may satisfy the detection of the traffic light in real time and prevent erroneous detection of red light and yellow light.

In some embodiments, the current light status of the traffic light may be determined by, for example, a traffic light detector. According to signals provided by the traffic light detector, the current light status of the traffic light (e.g., the red light status, the green light status or the yellow light status) may be accurately acquired. In the subsequent process of recovering the color and/or shape of the traffic light, the processor 130 may perform the color and/or shape recovery on an abnormal red light or an abnormal green light.

It should be noted that, statuses of an abnormal traffic light in the acquired image may be different under different environment conditions. For example, in the daytime, the abnormal red light may be usually yellow and the halo may be small, while in the night, a middle region of the abnormal traffic light may be usually white and the halo may be large. Therefore, exposure parameters (e.g., exposure time) of the long-exposure frame image and the short-exposure frame image may need to be adjusted according to the different environment conditions. In addition, when acquiring the long-exposure and/or short-exposure frame images, a fixed time sequence may be determined. In the process for processing the image of the traffic light, the processor 130 may acquire only one short-exposure frame image per second, and acquire long-exposure frame images during the remaining time. For example, when a frame rate of a video frame is 25, the processor 130 may first acquire one short-exposure frame image and then acquire 24 long-exposure frame images. It should be noted that, the long-exposure frame image(s) may correspond to normal exposure parameters. The red light in the long-exposure frame image(s) may tend to be yellow or white. The shape of the red light in the long-exposure frame image(s) may change. That is, at least one of the color or the shape of the (current) light status in the long-exposure frame image(s) (also referred to as the first image(s)) may be substantially distorted with respect to a color or a shape of the traffic light. Therefore, in order to obtain an image in which the traffic light presents a normal shape, the short-exposure frame image may be acquired. The color or shape of the (current) light status in the short-exposure frame image (also referred to as the second image) may be substantially correct with respect to the color or shape of the traffic light. The exposure time of the short-exposure frame image may be shorter than that of the long-exposure frame image. Further, exposure parameters of the short-exposure frame image may be set to ensure that scenario brightness in the acquired short-exposure frame image may not be too dark and may not influence the recovery of the shape of the traffic light.

In some embodiments, after acquiring the long-exposure frame image and the short-exposure frame image in the current light status, the processor 130 may further determine a specified region in the long-exposure frame image and the short-exposure frame image as a ROI (also referred to as a AOI). The ROI may include a region where the traffic light appears.

In some embodiments, to recover a shape of the traffic light based on regions of the traffic light in the long-exposure frame image and the short-exposure frame image to determine a shape recovery image of the traffic light, the processor 130 may locate regions of the traffic light in the ROI of the long-exposure frame image and the short-exposure frame image. The processor 130 may further fuse the regions of the traffic light of a frame of the long-exposure frame image and a frame of the short-exposure frame image to recover the shape of the traffic light and further determine the shape recovery image of the traffic light.

There may be regions irrelevant to the traffic light in the long-exposure frame image and short-exposure frame image. In order to avoid resource waste and low efficiency of image processing on the regions irrelevant to the traffic light, a region including the traffic light may be designated manually as a ROI. For example, a coordinate position of the ROI may be set manually. In some embodiments, the ROI may be a rectangular region.

In some embodiments, to locate the regions of the traffic light in the ROI of the long-exposure frame image and the short-exposure frame image, the processor 130 may acquire color values of each pixel in the ROI of the long-exposure frame image in a RGB color space and color values of the each pixel in the ROI of the short-exposure frame image in the RGB color space.

For each pixel, the processor 130 may determine whether the color values of the pixel in the RGB color space satisfies a predetermined condition. In some embodiments, pixel(s) satisfying the predetermined condition may be assigned with a first binary value (e.g., 1), and pixel(s) not satisfying the predetermined condition may be as assigned with a second binary value (e.g., 0). Thus, a binary image of the ROI may be obtained.

The processor 130 may constitute the pixels satisfying the predetermined condition to a first abnormal region of the traffic light. The processor 130 may take the first abnormal region of the traffic light in the binary image as the region of the traffic light.

In some embodiments, when the current light status is red light status, the predetermined condition may include, for each pixel, a difference between a first ratio r/g of a red channel value (also referred to as a first color channel) and a green channel value (also referred to as a second color channel) in the short-exposure frame image and a second ratio r'/g' of the red channel value and the green channel value in the long-exposure frame image being greater than a first predetermined threshold, and the red channel value (i.e., the first color channel) r' of the pixel in the long-exposure frame image being greater than a second predetermined threshold.

In some embodiments, when the current light status is green light status, the predetermined condition may include, for each pixel, a difference between a third ratio (also referred to as a first ratio) g/r of a green channel value (also referred to as a first channel) and a red channel value (also referred to as a second channel) in the short-exposure frame image and a fourth ratio (also referred to as a second ratio) g'/r' of the green channel value and the red channel value in the long-exposure frame image being greater than a third predetermined threshold (also referred to as a first threshold), and the green channel value (i.e., the first color channel) g' of the pixel in the long-exposure frame image being greater than a fourth predetermined threshold (also referred to as a second threshold).

It should be noted that, for the red light status, an abnormal red light may present yellow or white and the second ratio r'/g' may be close to 1 in the long-exposure frame image, while the red light may present red and the first ratio r/g may be greater than 1 in the short-exposure frame image. Thus, there may be a different between the first ratio r/g and the second ratio r'/g' in an abnormal region of the red light. For the green light status, an abnormal green light may present white and the fourth ratio g'/r' may be 1 in the long-exposure frame image, while the green light may present green and the third ratio g/r may be greater than 1 in the short-exposure frame image. Thus, there may be a different between the third ratio g/r and the fourth ratio g'/r' in an abnormal region of the green light. The processor 130 may locate the abnormal region of the red light according to the different between the first ratio r/g and the second ratio r'/g' in the red light status. The processor 130 may also locate the abnormal region of the green light according to the different between the third ratio g/r and the fourth ratio g'/r' in the green light status. In the process for processing the image of traffic light provided by some embodiments of the present application, the processor 130 may simultaneously determine and locate abnormal pixel(s) of the traffic light according to the difference between the first ratio r/g and the second ratio r'/g', or the different between the third ratio g/r and the fourth ratio g'/r'. Besides, erroneous detection of sky or traffic light panels as traffic lights can be avoided by using the process for determining and locating the abnormal pixel(s) of the traffic light provided by some embodiments of the present application.

FIG. 9 is a flowchart of an exemplary process for locating a region of an abnormal red light according to some embodiments of the present disclosure.

In 901, pixels may be traversed, and whether the traverse is terminated may be determined. The operation 901 may be executed by the processor 130. In response to a determination that the traverse is terminated, the process may proceed to 905. In response to a determination that the traverse is not terminated, the process may proceed to 902.

In 902, for a pixel, a first ratio r/g of a red channel value (also referred to as a first color channel) and a green channel value (also referred to as a second color channel) in the short-exposure frame image and a second ratio r'/g' of the red channel value and the green channel value in the long-exposure frame image may be determined. A difference between the first ratio r/g and the second ratio r'/g' may be also determined. The operation 902 may be executed by the processor 130.

In 903, whether the difference between the first ratio r/g and the second ratio r'/g' is greater than a first predetermined threshold thr1 (also referred to as a first threshold) may be determined. The operation 903 may be executed by the processor 130. In response to a determination that the difference between the first ratio r/g and the second ratio r'/g' is greater than the first predetermined threshold thr1, the process may proceed to 904. In response to a determination that the difference between the first ratio r/g and the second ratio r'/g' is less than or equal to the first predetermined threshold thr1, the processor 130 may assign the pixel with a second binary value. For example, the processor 130 may determine the pixel as 0. Then the process may proceed to 901.

In 904, whether the red channel value r' of the pixel in the long-exposure frame image is greater than a second predetermined threshold thr2 (also referred to as a second threshold) may be determined. The operation 904 may be executed by the processor 130. In response to a determination that the red channel value r' of the pixel in the long-exposure frame image is greater than the second predetermined threshold thr2, the processor 130 may assign the pixel with a first binary value. For example, the processor 130 may determine the pixel as 1. Then the process may proceed to 901. In response to a determination that the red channel value r' of the pixel in the long-exposure frame image is less than or equal to the second predetermined threshold thr2, the processor 130 may assign the pixel with the second binary value. For example, the processor 130 may determine the pixel as 0. Then the process may proceed to 901.

In 905, a dilation operation with a radius of N may be performed on a binary image obtained by traversing the pixels. The operation 905 may be executed by the processor 130. In some embodiments, the processor may then perform an erosion operation with a radius of 2N on, for example, the dilated binary image. The processor 130 may then perform a dilation operation with a radius of N on, for example, the eroded binary image. N may represent the number of the pixels.

In 906, a connected region labeling operation may be performed on the processed binary image to determine a position of an abnormal red light. The operation 906 may be executed by the processor 130.

In 907, the process may end.

It should be noted that, in some embodiments, in the binary image, pixels in a background region may be set as 0 and pixels in a target region may be set as 1. In order to extract features of different regions in the binary image, connected regions may be labeled. In some embodiments, noise may exist in the binary image obtained by traversing the pixels. The noise may cause discontinuity in the target region. Therefore, before performing the connected region labeling operation, the processor may perform a morphological filtering operation (the dilation and/or erosion operation) on the binary image to remove the noise. The connected region labeling operation may refer to an operation in which pixels in an image that satisfy a certain connection rule may be represented by a same label. Exemplary connection rules may include a four-neighborhood connection rule, an eight-neighborhood connection rule, or the like, or any combination thereof. Exemplary image labeling algorithms may include a pixel labeling algorithm, a line labeling algorithm, a region growth algorithm, or the like, or any combination thereof.

In some embodiments, to fuse the regions of the traffic light of the frame of the long-exposure frame image and the frame of the short-exposure frame image to recover the shape of the traffic light and further obtain the shape recovery image of the traffic light, the processor 130 may generate a fusion mask according to the binary image. The processor 130 may perform a fusion operation using the fusion mask, the long-exposure frame image and the short-exposure frame image according to a predetermined fusion condition. For example, the processor 130 may fuse the regions of the long-exposure frame image and the short-exposure frame image based on the generated fusion mask.

FIG. 10 is a flowchart of an exemplary process for generating a fusion mask according to the binary image according to some embodiments of the present disclosure.

In 1001, a minimum circumcircle region of connected regions in the binary image may be determined. The operation 1001 may be executed by the processor 130. In some embodiments, the radius of the minimum circumcircle region may be r, and the center of the minimum circumcircle region may be center.

In 1002, the minimum circumcircle region may be expanded to obtain a new circular region with a radius of r'. The operation 1002 may be executed by the processor 130. The radius r' may be determined by adding d to r. d is a distance expanded along a radius direction.

In 1003, a weight of a circular fusion mask w may be determined. The operation 1003 may be executed by the processor 130.

The weight of the circular fusion mask w may be determined along a border toward the center of the new circular region. Merely by way of example, the weight of the circular fusion mask may be determined according to Formula (2) as below:

$$w = \begin{cases} 1 - \dfrac{dis - (r' - \text{border})}{\text{border}} & dis \geq r' - \text{border} \\ 1 & \text{others} \end{cases} \quad (2)$$

wherein d is is a distance from a point to the center; and border is a radius of a transitional border.

The processor 130 may fuse the long-exposure frame image and the short-exposure frame image by using the circular fusion mask determined in FIG. 10 according to a fusion condition. In some embodiments, the fusion condition may be determined according to Formula (3) as below:

$$\text{img\_new} = \text{img\_long} \times (1-w) + \text{img\_sort} \times w; \quad (3)$$

wherein img_new is bayer data of an image after fusion; img_long is original bayer data of the long-exposure frame image; and img_sort is original bayer data of the short-exposure frame image.

In some embodiments, before locating the regions of the traffic light in the ROI of the long-exposure frame image and the short-exposure frame image, the processor 130 may perform a white balance operation and an interpolation operation successively on the ROI in the long-exposure frame image and the short-exposure frame image. The processor 130 may further perform a halo reducing operation on the ROI in the long-exposure frame image.

It should be noted that, the acquired long-exposure frame image and short-exposure frame image may be unprocessed image data (i.e., RAW data), which are usually represented in a bayer format. In some embodiments, the bayer format may be converted to a RGB format. Taking the red light as an example, for a long-exposure frame image or a short-exposure frame image, the processor 130 may perform a white balance operation by multiplying R channel values in the bayer format by white balance gain parameter r_gain and/or multiplying B channel values in the bayer format by white balance gain parameter g_gain. The processor 130 may further perform an interpolation operation to convert the bayer format to the RGB format, to ensure each pixel may have a RGB channel value. For example, bilinear interpolation may be used to convert the bayer format to the RGB format. For the long-exposure frame image, the processor 130 may perform a halo reducing operation after the interpolation operation, which may avoid an abrupt recovery effect of the shape of the traffic light caused by a large halo in the long-exposure frame when recovering the shape of the traffic light according to the long-exposure frame image and the short-exposure frame image.

Taking the red light as example, FIG. 11 is a flowchart of an exemplary process for performing a halo reducing operation on the long-exposure frame image according to some embodiments of the present disclosure.

In 1101, pixels may be traversed, and whether the traverse is terminated may be determined. The operation 1101 may be executed by the processor 130. In response to a determination that the traverse is terminated, the process may proceed to 1104. Alternatively, in response to a determination that the traverse is not terminated, the process may proceed to 1102.

In 1102, for a pixel, the red channel value r' and the green channel value g' in the long-exposure frame image may be compared. The operation 1102 may be executed by the processor 130. Specifically, the processor 130 may determine whether r'>Sr×g' is satisfied. In response to a determination that r'>Sr×g' is satisfied, the processor 130 may modify the red channel value r' to ensure r'=Sr×g'. Then the process may proceed to 1103. In response to a determination that r'>Sr×g' is not satisfied, the process may proceed to 1101. In some embodiments, Sr may be an intensity parameter of halo weaken. The smaller the value of Sr is, the stronger the halo weaken is.

In 1103, the green channel value b' of the pixel in the processed long-exposure frame image and the green channel value g' of the pixel in the long-exposure frame image may be compared. The operation 1103 may be executed by the processor 130. The processor 130 may determine whether b'<Sb×g' is satisfied. In response to a determination that b'<Sb×g' is satisfied, the processor 130 may modify b' to ensure b'=Sb×g'. Then the process may proceed to 1101. In response to a determination that b'<Sb×g' is not satisfied, the process may proceed to 1101. Sb is an intensity parameter of halo yellow suppression. The smaller the value of Sb is, the stronger the halo yellow suppression is.

In 1104, the process may end.

It should be noted that the values of Sr and Sb may be determined according to actual conditions, and may not be limited in the present application.

In some embodiments, after recovering the shape of the traffic light based on the regions of the traffic light in the long-exposure frame image and the short-exposure frame image in the current light status to determine the shape recovery image of the traffic light, the process may perform the following operations.

The processor 130 may obtain (e.g., extract) a halo region of the traffic light from the first abnormal region of the traffic light.

The processor 130 may extract a highlight region from the first abnormal region of the traffic light. The brightness of the highlight region may satisfy a predetermined brightness condition.

If an overlapped region between the extracted halo region and highlight region exists, the processor 130 may determine the overlapped region as a second abnormal region of the traffic light.

According to the current light status, the processor 130 may recover the color of the traffic light in the shape recovery image by performing one or more following operations.

The processor 130 may divide the first abnormal region of the traffic light into a plurality of rectangular regions.

The processor 130 may determine an average brightness of each of the rectangular regions.

The processor 130 may determine a color correction level of each of the rectangular regions according to the average brightness of each of the rectangular regions.

For each pixel in each rectangular region, if the pixel is in the second abnormal region of the traffic light, the processor 130 may convert a color value of the pixel in the RGB space to the color value in an HSV space. The processor 130 may further adjust the hue and saturation of the pixel in the HSV space, and then convert the color value of the pixel in the HSV space to the color value in the RGB space.

Taking the red light as an example, the abnormal red light may be distinguished from the yellow and green lights by a red halo around the red light. Therefore, after locating a first abnormal region of the red light, the processor 130 may locate the red halo in the region. For example, to locate the red halo in an Lab color space, the processor 130 may perform a binarization operation to obtain a binary image, perform a morphological filtering operation on the binary image to remove noise, and then perform a connected region labeling operation to obtain the red halo region. Since the traffic light is a self-luminous object, the brightness of the traffic light may be relatively high. For the red light, when an imaging medium (e.g., a charge-coupled device (CCD)) responds to the red light, a red component may first reach saturation, then a green component, and finally a blue component, which result in the largest red component value, followed by a green component value, and the smallest blue component value. After locating the first abnormal region of the red light, regions of which brightness satisfies the condition but color does not satisfy the condition may be removed from the first abnormal region by a processor (e.g., the processor 130). The processor 130 may set regions satisfying the condition to 255 and others to 0. Thus, a binary image may be generated. The processor 130 may perform the morphological filtering operation on the binary image to remove noise. The processor 130 may then perform the connected region labeling operation such that a high-brightness region may be located in the abnormal region of the red light. In general, the abnormal region of the red light may include a red halo region and a highlight region. In some embodiments, the red halo region may be around the highlight region. When the red halo region encloses the highlight region, the processor 130 may determine the highlight region as the abnormal region of the red light. In some embodiments according to the present application, the abnormal region of the red light may be located accurately according to the overlapped region of the halo region and the highlight region, and other objects (such as rear lights) may be further prevented from being erroneously detected as traffic lights.

Hereinafter, for the shape recovery image of the traffic light in the current light status, the extraction of the halo region of the traffic light from the first abnormal region of the traffic light, the extraction of the highlight region from the first abnormal region of the traffic light, and the determination of the overlapped region of the halo region and the highlight region as the second abnormal region of the traffic light may be described in detail in the following descriptions.

In some embodiments, the extraction of the halo region of the traffic light from the first abnormal region of the traffic light may include extracting a halo region from the first abnormal region of the traffic light. A color of the halo region may be within a first color range corresponding to the current light status (e.g., a color of the traffic light in the current light status).

In some embodiments, the extraction of the highlight region from the first abnormal region of the traffic light may include extracting the highlight region from the first abnormal region of the traffic light. The brightness of the highlight region may satisfy a predetermined brightness condition. A color of the highlight region may be within a second color range corresponding to the current light status (e.g., a color of an abnormal traffic light in the current light status). The brightness of the highlight region may be greater than a threshold brightness.

It should be noted that the order of extracting the halo region of the traffic light from the first abnormal region of the traffic light and extracting the highlight region from the first abnormal region of the traffic light is not limited.

It should be noted that a color may be represented by three parameters, i.e., brightness, hue and saturation. Color values of a halo of a traffic light may not be completely the same, but the hue of the halo may be substantially unchanged. For example, the halo of the red light may be still red, while the degree of red may vary, that is, the color values of the halo may not be completely the same. In some embodiments of the present application, in order to improve the accuracy of determining the halo, the first color range of the red light status may be a predetermined range of red, and the first color range of the green light status may be a predetermined range of green. Similarly, different traffic lights may have different color casts. For example, the color cast of the red light may be usually yellow or white, while the color cast of the green light may be usually white. Therefore, in order to improve the accuracy of determining the highlight region, the second color range of the red light status may be a first predetermined range of white or a first predetermined range of yellow, and the second color range of the green light status may be a second predetermined range of white. The highlight regions may be distinguished by certain color ranges by a processor (e.g., the processor 130), and the desired highlight region may be extracted by a processor (e.g., the processor 130) as much as possible.

It should be noted that the color of the halo region may be within the first color range corresponding to the color of the traffic light in the current light status. Therefore, in order to extract the halo region, whether a color of a pixel is within the first color range may be determined by a processor (e.g., the processor 130). In response to a determination that the color of the pixel is within the first color range, the processor 130 may determine that the pixel belongs to the halo region. In some embodiments, to facilitate the description and determination of the first color range, and determine whether a pixel belongs to the halo region, the extracting of the halo region from the first abnormal region of the traffic light may be performed by a processor (e.g., the processor 130) according to the following operations.

In A1, color values of pixels in the first abnormal region of the traffic light may be converted to an Lab color space. The operation A1 may be executed by the processor 130.

In A2, for each pixel in the first abnormal region of the traffic light, whether a color value of the pixel in the Lab color space is within the first color range corresponding to the color of the traffic light in the current light status may be determined. The operation A2 may be executed by the processor 130. The first color range may be a color region obtained by linearly segmenting the Lab color space according to the color of the current light status.

An L component in the Lab color space may represent a brightness of a pixel, ranging from 0 to 100, which may represent a range from black to white. "a" may represent a range from red to green, ranging from 127 to −128. "b" may represent a range from yellow to blue, ranging from 127 to −128. Assuming that a pixel has a color value of (L, a, b), whether the pixel is within the first color range may be determined according to Formula (1) described elsewhere in the present disclosure by a processor (e.g., the processor 130). For example, the pixel may be within the first color range if the color value of (L, a, b) of the pixel satisfies conditions in Formula (1) described elsewhere in the present disclosure.

In A3, in response to a determination that the color value of the pixel in the Lab color space is within the first color range, the pixel may be determined as a point belonging to the halo region by a processor (e.g., the processor 130). That is, the processor 130 may determine the pixel to be in the halo region. Alternatively, in response to a determination that the color value of the pixel in the Lab color space is not within the first color range, the pixel may be determined as a point not belonging to the halo region by a processor (e.g., the processor 130).

As can be seen from operations A1 to A3, the first color range (e.g., the first color range of red light status, the first color range of green light status) may be obtained from the Lab color space by linear segmentation. Due to the property of linear segmentation, whether a color of a pixel is within the first color range may be determined by a mathematical formula, which may improve the efficiency of extracting the halo region of a processor (e.g., the processor 130).

It should be noted that, the expressions of the first color range may vary due to different color spaces. In some embodiments, the first color range may be determined according to a specific color space by a processor (e.g., the processor 130), which may be applicable to some embodiments of the present application.

The halo region extracted according to operations A1 to A3 may have noise, and the extracted region (or the halo region) may not be connected and may have voids. In some embodiments of the present application, in order to overcome the above problems and improve the accuracy of the extracted halo region, one or more operations may be performed by a processor (e.g., the processor 130).

In B1, the first abnormal region of the traffic light may be binarized. The operation B1 may be executed by the processor 130. The pixels belonging to the halo region may be assigned with a first binary value, and the pixels not belonging to the halo region may be assigned with a second binary value. For example, the processor 130 may set the pixels belonging to the halo region as 255 and the pixels not belonging to the halo region as 0.

In B2, noise may be removed from the binarized first abnormal region of the traffic light by a first erosion operation. The operation B2 may be executed by the processor 130.

In B3, the halo region may be determined by performing a first dilation operation on the de-noised first abnormal region of traffic light. The operation B3 may be executed by the processor 130.

In some embodiments, in order to facilitate extracting an accurate highlight region, the extracting of the highlight region from the first abnormal region of the traffic light may be performed according to the following operations by a processor (e.g., the processor 130).

In C1, for each pixel in the first abnormal region of the traffic light, whether the pixel satisfies one or more conditions may be determined. The operation C1 may be executed by the processor 130. The condition(s) may include the brightness being greater than a threshold brightness, and a color value of the pixel in the RGB color space being within the second color range corresponding to the color of the abnormal traffic light in the current light status.

In C2, in response to a determination that the pixel satisfies the one or more conditions, the pixel may be assigned with a first binary value. For example, the pixel may be set as 255. The operation C2 may be executed by the processor 130.

In C3, in response to a determination that the pixel doesn't satisfy the one or more conditions, the pixel may be assigned with a second binary value. For example, the pixel may be set as 0. The operation C3 may be executed by the processor 130.

In C4, noise may be removed from the first abnormal region of the traffic light by performing a second erosion operation. The operation C4 may be executed by the processor 130.

In C5, the highlight region may be determined by performing a second dilation operation on the first abnormal region of the traffic light after the second erosion operation. The operation C5 may be executed by the processor 130.

Similarly, in the extraction of the highlight region, the binarized highlight region may also include noise and voids. The problems (e.g., the noise and the voids) may be overcome by performing operations C4 and C5, which may make the extracted highlight region more accurate. The shapes and sizes of an erosion factor of the second erosion operation and a dilation factor of the second dilation operation may be set as needed by a processor (e.g., the processor 130), and may not be limited in the present application.

As for the determination of the brightness in operation C1, the RGB image may be converted to a gray-scale image by a processor (e.g., the processor 130). For each pixel, in response to a determination that a gray-scale value of the pixel is greater than a specified gray-scale value, the brightness of the pixel may be greater than the threshold brightness. Alternatively, in response to a determination that the gray-scale of the pixel is not greater than the specified gray-scale value, the brightness of the pixel may not be greater than the threshold brightness. In some embodiments, after the RGB image is converted into the gray-scale image, in order to improve the accuracy of the determination, a suitable specified gray-scale value may be determined for the gray-scale image by the processor using a filtrating method.

It should be noted that in some embodiments, there are many other ways to represent brightness, which may be used as needed. For example, the color values of the captured image (e.g., of the pixels in the captured image) may be converted to other color space with brightness information to determine whether the brightness is greater than the threshold brightness. In addition, the acquired image of the traffic light may satisfy the additive color principle, that is, the greater a sum of R, G, and B values is, the greater the brightness is. In some embodiments, the sum of R, G, and B values may be used to represent brightness, and whether the brightness is greater than the threshold brightness may be determined by a processor (e.g., the processor 130).

In some embodiments, environmental factors of the traffic light may influence the color value of the acquired image. For example, in the case of darkness such as night and rainy days, the captured image may be acquired by increasing exposure, which may influence the accuracy of extracting the highlight region in some embodiments of the present application. Therefore, in order to adapt to various environmental factors and extract the highlight region more accurately, before determining whether the pixel satisfies the one or more conditions in operation C1, one or more operations may be performed by a processor (e.g., the processor 130).

In D1, a current scenario corresponding to the current light status may be determined according to environmental factors (also referred to as environmental lighting conditions) in which the traffic light is. The operation D1 may be executed by the processor 130. The environmental factor may include at least one of weather conditions, exposure for acquiring the captured image, and intensities of ambient lights.

The weather conditions may include, for example, dark nights, cloudy daytime, rainy daytime, snowy daytime, and sunny daytime with good light.

The exposure may also reflect the intensities of ambient lights, and thus the intensities of the ambient lights may also be represented by the exposure.

It should be noted that, other environmental factors that can reflect the exposure may also be applicable to some embodiments of the present application, and may not be limited in the present application.

In D2, according to a relationship of preset scenarios and color ranges, a color range corresponding to the current scenario may be determined by the processor 130 as a second color range corresponding to a color of an abnormal traffic light in the current light status. The operation D2 may be executed by the processor 130.

By configuring different second color ranges for different scenarios, the highlight region for different scenarios may be effectively extracted by the processor 130 such that the accuracy of extracting the highlight region may be improved and a good foundation may be laid for determining the abnormal traffic light.

In some embodiments, in order to extract the highlight region accurately, each scenario may correspond a set of color thresholds. Each set of color thresholds may include a red threshold, a green threshold and a blue threshold.

For each scenario, the second color range of the red light status may include a red R value being greater than a red threshold of the red light status, a green G value being greater than a green threshold of the red light status, and a blue B value being smaller than a blue threshold of the red light status. Thus, the color cast corresponding to the red light may include yellow and white, and the color cast may be detected accurately by the processor 130.

For each scenario, the second color range of the green light status may include a red R value being greater than a red threshold of the green light status, a green G value being greater than a green threshold of the green light status, and a blue B value being smaller than a blue threshold of the green light status. The greatest difference of the R, G and B values may be smaller or equal to a predetermined difference. Since the color cast of the green light may be usually white, the color cast of white may be processed by setting the greatest difference of the R, G and B values being smaller or equal to the predetermined difference.

In some embodiments, in order to facilitate locating the position of the abnormal traffic light accurately, one or more operations may be performed, for example, by the processor 130. Specifically, the processor 130 may label the first abnormal region of the traffic light after the first dilation operation according to a connected region labeling algorithm to obtain the halo region consisting of at least one first connected region with a label. The processor 130 may also label the first abnormal region of the traffic light after the second dilation operation according to the connected region labeling algorithm to obtain the highlight region consisting of at least one second connected region with a label. Thus, each position may be represented by the label of the connected region.

After the label of each connected region is determined, the processor 130 may determine that the abnormal traffic light in the current light status exists in the first abnormal region of the traffic light if there is an overlapped region between the halo region and the highlight region. The determination may be performed according to the following operations.

In E1, for each second connected region, whether a first connected region which overlaps with the second connected region exists may be determined. The operation E1 may be executed by the processor 130.

In E2, in response to a determination that the first connected region which overlaps with the second connected region doesn't exist, the processor 130 may determine that the abnormal traffic light does not exist in the second connected region. Alternatively, in response to a determination that the first connected region which overlaps with the second connected region (also referred to as an overlapped region) exists, the processor 130 may determine a proportion (also referred to as a ratio) of an overlapped portion of the second connected region and the first connected region to the second connected region.

In E3, if the proportion is greater than a predetermined proportion (also referred to as a threshold), the second connected region may be determined as the position of the abnormal traffic light, and the label of the second connected region may be taken as a label of the position of the abnormal traffic light. The operation E3 may be executed by the processor 130.

Taking the red light as an example, FIG. 12 is a flowchart of an exemplary process for recovering the color of the abnormal red light after determining the second abnormal region of the traffic light according to some embodiments of the present disclosure.

In 1201, a rectangular region may be traversed, and whether the traverse is terminated may be determined. The operation 1201 may be executed by the processor 130. In response to a determination that the traverse is terminated, the process may proceed to 1206. Alternatively, in response to a determination that the traverse is not terminated, the process may proceed to 1202.

In 1202, an average brightness y_avg of the rectangular region may be determined. The operation 1202 may be executed by the processor 130.

In 1203, a color correction level degree of the rectangular region may be determined based on the average brightness of the rectangular region. The operation 1203 may be executed by the processor 130. In some embodiments, the color correction level degree may satisfy Formula (4) as below:

$$degree = \begin{cases} y_1; & y\_avg < x_1 \\ y_2; & y\_avg > x_2; \\ \min(y\_avg \times (y_2 - y_1) - y_2 \times x_1 - y_1 \times x_2); & others \end{cases} \quad (4)$$

wherein $x_1$, $x_2$, $y_1$, and $y_2$ represent coordinate ranges of the rectangular region.

In 1204, pixels in the rectangular region may be traversed, and whether the traverse is terminated may be determined. The operation 1204 may be executed by the processor 130. In response to a determination that the traverse is terminated, the process may proceed to 1201. Alternatively, in response to a determination that the traverse is not terminated, the process may proceed to 1205.

In 1205, whether a mask corresponding to the pixel is 1 may be determined. The operation 1205 may be executed by the processor 130. In response to a determination that the mask corresponding to the pixel is 1, the processor 130 may convert a color value of the pixel in the RGB space to a color value in an HSV space. The processor 130 may adjust H and S values of the pixel, and further convert the adjusted color values of the pixel in the HSV space to new color value in the RGB space. Then the process may proceed to 1206. Alternatively, in response to a determination that the mask corresponding to the pixel is not 1, the process may proceed to 1204.

In 1206, the process may end.

It should be noted that, in the color recovery of the abnormal red light as illustrated in FIG. 12, the mask in operation 1205 may be a binary image after extracting the highlight region. In 1205, the processor 130 may adjust H according to Formula (5) as below:

$$H = \begin{cases} H; & \text{degree} = 0 \\ 5; & \text{others} \end{cases}; \quad (5)$$

In 1205, the processor 130 may not adjust S if the correction level degree=0. Alternatively, the processor 130 may adjust S if the correction level degree≥0.

In S1, the processor 130 may designate new with the value of S (i.e., new=S). In response to a determination that new≥degree, the process may proceed to S3. In response to a determination that new<degree, the process may proceed to S2.

In S2, the processor 130 may update the value of new (e.g., new=1.367×new). In response to a determination that new≥degree or the number of iterations is greater than 9, the process may proceed to S3. In response to a determination that new<degree and the number of iterations is equal to or less than 9, the process may proceed to S2.

In S3, the processor 130 may determine S based on the updated new (e.g., S=new/100), and perform a filtering on S.

FIG. 13 is a schematic diagram of a device for processing an image of a traffic light, which is corresponding to the process for processing the image of the traffic light provided by some embodiments of the present application. The device may include a traffic light detection module 1301, an acquisition module 1302, a shape recovery module 1303, and a color recovery module 1304.

The traffic light detection module 1301 may be configured to determine a current light status of a traffic light. The current light status may include a red light status (also referred to as a red light), a green light status (also referred to as a green light), and a yellow light status (also referred to as a yellow light).

The acquisition module 1302 may be configured to acquire a long-exposure frame image (also referred to as a first image corresponding to a first exposure time) and a short-exposure frame image (also referred to as second image corresponding to a second exposure time) in the current light status.

The shape recovery module 1303 may be configured to recover a shape of the traffic light based on regions of the traffic light in the long-exposure frame image and the short-exposure frame image in the current light status, to obtain a shape recovery image of the traffic light.

The color recovery module 1304 may be configured to recover a color of the traffic light in the shape recovery image based on the current light status. Thus, a target image may be determined.

The present application provides the device for processing the image of the traffic light. The acquisition module 1302 may acquire the long-exposure frame image and the short-exposure frame image in the current light status. The shape recovery module 1303 may recover the shape of the traffic light according to the regions of the traffic light in the long-exposure frame image and the short-exposure frame image. The color recovery module 1304 may recover the color of the traffic light. That is, according to the device, not only the color of the traffic light can be recovered, but also the shape of the traffic light can be recovered, which may make the recovery of the traffic light more accurate. What's more, according to the device, before recovering the shape and the color of the traffic light, the traffic light detection module 1301 may determine the current light status of the traffic light, which may satisfy the detection of the traffic light in real time and prevent erroneous detection of the red light and the yellow light.

The traffic light detection module 1301 may include, for example, a traffic light detector. According to signals provided by the traffic light detector, the current light status of the traffic light (e.g., the red light status, the green light status or the yellow light status) may be accurately acquired. In the subsequent process of recovering the color and/or shape of the traffic light, the color and shape recovery may be performed on an abnormal red light or an abnormal green light.

In some embodiments, the shape recovery module 1303 may be further configured to, after the acquisition module 1302 acquires the long-exposure frame image and the short-exposure frame image in the current light status, acquire a specified region from the long-exposure frame image and the short-exposure frame image as a ROI (also referred to as an AOI). The ROI may include a region where the traffic light appears.

The shape recovery module 1303 may further include a traffic light locating module and a traffic light fusion module.

The traffic light locating module may be configured to locate regions of the traffic light in the ROI of the long-exposure frame image and the short-exposure frame image.

The traffic light fusion module may be configured to fuse the regions of the traffic light on a frame of the long-exposure frame image and a frame of the short-exposure frame image, to recover the shape of the current traffic light and further determine the shape recovery image of the traffic light.

In some embodiments, the traffic light locating module may be further configured to acquire color values of each pixel in the ROI of the long-exposure frame image in a RGB space and color values of each pixel in the ROI of the short-exposure frame image in the RGB space.

The traffic light locating module may, for each pixel, determine whether the color values of the pixel in the RGB space satisfy a predetermined condition. The traffic light locating module may assign pixels satisfying the predetermined condition with a first binary value (e.g., 1) and pixels not satisfying the predetermined condition with a second binary value (e.g., 0). Thus, a binary image of the ROI may be determined.

The traffic light locating module may constitute the pixels satisfying the predetermined condition to a first abnormal region of the traffic light, and take the first abnormal region of the traffic light in the binary image as a region of the traffic light.

In some embodiments, when the current light status is red light status, the predetermined condition may include, for each pixel, a different between a first ratio r/g of a red channel value (also referred to as a first color channel) and a green channel value (also referred to as a second color channel) in the short-exposure frame image and a second ratio r'/g' of the red channel value and the green channel value in the long-exposure frame image being greater than the first predetermined threshold (also referred to as a first threshold), and the red channel value r' of the pixel in the long-exposure frame image being greater than a second predetermined threshold (also referred to as a second threshold).

In some embodiments, when the current light status is green light status, the predetermined condition may include, for each pixel, a different between a third ratio g/r of a green channel value (also referred to as a first color channel) and a red channel value (also referred to as a second color channel) in the short-exposure frame image and a fourth ratio g'/r' of the green channel value and the red channel value in the long-exposure frame image being greater than a third predetermined threshold (also referred to as a first threshold), and a green channel value g' of the pixel in the long-exposure frame image being greater than a forth predetermined threshold (also referred to as a second threshold).

In some embodiments, the traffic light fusion module may be further configured to generate a fusion mask according to the binary image.

In some embodiments, the traffic light fusion module may perform fusion by using the fusion mask, the long-exposure frame image and the short-exposure frame image according to a predetermined fusion condition.

In some embodiments, the shape recovery module may further include a pre-processing module. The pre-processing module may be configured to, before locating the regions of the traffic light in the ROI of the long-exposure frame image and the short-exposure frame image, perform a white balance operation and an interpolation operation successively on the ROI in the long-exposure frame image and the short-exposure frame image, and perform a halo reducing operation on the ROI in the long-exposure frame image.

In some embodiments, the device may further include a halo detection module, a highlight region detection module, and an abnormal region determination module.

The halo detection module may be configured to acquire and/or extract a halo region of the traffic light from the first abnormal region of the traffic light.

The highlight region detection module may be configured to extract a highlight region from the first abnormal region of the traffic light. The brightness of the highlight region may satisfy a predetermined brightness condition.

The abnormal region determination module may be configured to, if there is an overlapped region between the extracted halo region and highlight region, determine the overlapped region as a second abnormal traffic light region.

In some embodiments, the color recovery module 1304 may divide the first abnormal region of the traffic light region into a plurality of rectangular regions.

The color recovery module 1304 may calculate an average brightness of each of the rectangular regions.

The color recovery module 1304 may further determine a color correction level of each of the rectangular regions according to the average brightness of each of the rectangular regions.

For each pixel in each rectangular region, when the pixel is in the second abnormal region of the traffic light, the color recovery module 1304 may convert color values of the pixel in the RGB color space to color values in an HSV space. The color recovery module 1304 may adjust hue and saturation of the pixel, and convert the adjusted color values of the rectangular region in the HSV space to the color values in the RGB space.

Hereinafter, the halo detection module, the highlight region detection module and the abnormal region provided by some embodiments of the present application may be described in details.

In some embodiments, the halo detection module may extract a halo region from first abnormal region of the traffic light. A color of the halo region may be within a first color range corresponding to a color of the traffic light in the current light status.

In some embodiments, the highlight region detection module may extract a highlight region from the first abnormal region of the traffic light. A color of the highlight region may be within a second color range corresponding to a color of an abnormal traffic light in the current light status. The brightness of the highlight region may be greater than a threshold brightness.

In some embodiments, the halo detection module may include a color conversion unit, a first color range determination unit, and a halo determination unit.

The color conversion unit may be configured to convert the color values of pixels in the first abnormal region of the traffic light to an Lab color space.

The first color range determination unit may be configured to, for each pixel in the first abnormal region of the traffic light, determine whether a color value of the pixel in the Lab color space is within the first color range corresponding to the color of the traffic light in the current light status. The first color range may be a color region obtained by linearly segmenting the Lab color space according to the color of the current light status.

The halo determination unit may be configured to, in response to a determination that the color value of the pixel in the Lab color space is within the first color range, determine the pixel as a point belonging to the halo region. The halo determination may be also configured to, in response to a determination that the color value of the pixel in the Lab color space is not within the first color range, determine the pixel as a point not belonging to the halo region.

In some embodiments, the device may further include a binarization module, an erosion module, and a halo optimization module.

The binarization module may be configured to binarize the first abnormal region of the traffic light. The binarization module may set the pixel belonging to the halo region as 255 and the pixel not belonging to the halo region as 0.

The erosion module may be configured to remove noise from the binarized first abnormal region of the traffic light by performing a first erosion operation.

The halo optimization module may be configured to determine the halo region by performing a first dilation operation on the de-noised first abnormal region of the traffic light.

In some embodiments, the highlight region detection module may include a second color range determination unit, a first binarization unit, a second binarization unit, an erosion unit, and a highlight region determination unit.

The second color range determination unit may be configured to, for each pixel in the first abnormal region of the traffic light, determine whether the pixel satisfies one or more conditions. The condition(s) may include the brightness being greater than a threshold brightness, and the color value of the pixel in the RGB color space being within the second color range corresponding to the color of an abnormal traffic light in the current light status.

The first binarization unit may be configured to, in response to a determination that the pixel satisfies the one or more conditions, set the pixel as 255.

The second binarization unit may be configured to, in response to a determination that the pixel doesn't satisfy the one or more conditions, set the pixel as 0.

The erosion unit may be configured to remove noise from the first abnormal region of the traffic light by performing a second erosion operation.

The highlight region determination unit may be configured to determine the highlight region by performing a second dilation operation on the first abnormal region of the traffic light after the second erosion operation.

In some embodiments, the device may include a first region labeling module, and a second region labeling module.

The first region labeling module may be configured to label the first abnormal region of the traffic light after the first dilation operation according to a connected region labeling algorithm to determine the halo region consisting of at least one first connected region with a label.

The second region labeling module may be configured to label the first abnormal region of the traffic light after the second dilation operation according to the connected region labeling algorithm to determine the highlight region consisting of at least one second connected region with a label.

In some embodiments, the abnormal region determination module may include an overlapping determination unit, a normality determination unit, a calculation unit, and an abnormity determination unit.

The overlapping determination unit may be configured to, for each second connected region, determine whether a first connected region which overlaps with the second connected region exists.

The normality determination unit may be configured to, in response to a determination that the first connected region which overlaps with the second connected region doesn't exist, determine that the abnormal traffic light does not exist in the second connected region.

The calculation unit may be configured to, in response to a determination that the first connected region which overlaps with the second connected region exists, determine a proportion of an overlapped portion of the second connected region and the first connected region to the second connected region.

The abnormity determination unit may be configured to determine the second connected region as the position of the abnormal traffic light and take the label of the second connected region as a label of the position of the abnormal traffic light if the proportion is greater than a predetermined proportion.

In some embodiments, the device may include a current scenario determination module, and a second color range determination unit.

The current scenario determination module may be configured to, before the second color range determination unit determines whether the pixel in the RGB color space satisfies the one or more conditions, determine a current scenario corresponding to the current light status according to environmental factors in which the traffic light is. The environmental factors may include at least one of weather conditions, exposure for acquiring the captured image, and intensities of ambient lights.

The second color range determination unit may be configured to, according to a relationship of preset scenarios and color ranges, determine a color range corresponding to the current scenario as a second color range corresponding to a color of an abnormal traffic light in the current light status.

In some embodiments, each scenario may correspond a set of color thresholds, and each set of color thresholds may include a red threshold, a green threshold and a blue threshold.

For each scenario, the second color range of the red light status may include a red R value being greater than a red threshold of the red light status, a green G value being greater than a green threshold of the red light status, and a blue B value being smaller than a blue threshold of the red light status.

For each scenario, the second color range of the green light status may include a red R value being greater than a red threshold of the green light status, a green G value being greater than a green threshold of the green light status, and a blue B value being smaller than a blue threshold of the green light status. The greatest difference of the R, G and B values may be smaller or equal to a predetermined difference.

It should be noted that the acquisition module 1302 and the shape recovery module 1303 may perform the operations in an RAW domain. The halo detection module, the highlight region detection module, the abnormal region determination module and the color recovery module 1304 may perform the operations in a YUV (Y may represent a brightness component, and U and V may represent color difference components) domain. For example, the data format of the ROI may be converted from a YUV format to a RGB format, an Lab format, or the like.

In summary, some embodiments of the present application provides the process and device for processing the image of the traffic light. According to the process, the processor 130 may acquire the long-exposure frame image and the short-exposure frame image in the current light status. The processor 130 may recover the shape of the current traffic light according to the regions of the traffic light in the long-exposure frame image and the short-exposure frame image, and recovering the color of the traffic light. Thus, according to the process, not only the color of the traffic light may be recovered, but also the shape of the traffic light may be recovered, which may make the recovery of the traffic light more accurate. What's more, according to the process, before recovering the shape and the color of the traffic light, the processor 130 may determine the current light status of the traffic light, which may satisfy the detection of the traffic light in real time and prevent erroneous detection of the red light and the yellow light. According to the process, the processor 130 may acquire a specified region from the long-exposure frame image and the short-exposure frame image as the ROI, which may avoid resource waste and low efficiency of image processing on the region irrelevant to the traffic light. In the process for processing the image of the traffic light provided by some embodiments of the present application, the processor 130 may simultaneously determine and locate abnormal pixel(s) of the traffic light according to the difference between the first ratio r/g and the second ratio r'/g', or the different between the third ratio g/r and the fourth ratio g'/r'. Besides, erroneous detection of sky or signal light panels as traffic lights may be avoided by using the process for determining and locating the abnormal pixel(s) of the traffic light provided by some embodiments of the present application. In the process for processing the image of the traffic light provided by some embodiments of the present application, the processor 130 may perform the halo reducing operation on the long-exposure frame image, which may avoid an abrupt recovery effect of the shape of the traffic light caused by a large halo in the long-exposure frame when recovering the shape of the traffic light according to the long-exposure frame image and the short-exposure frame image. The abnormal region of the traffic light may be located accurately according to the overlapped region of the halo region and the highlight region in some embodiments of the present application, and other objects (such as rear lights) may be further prevented from being erroneously detected as traffic lights.

What is claimed is:

1. A system for processing images, comprising:
   at least one storage medium including a set of instructions; and
   at least one processor in communication with the at least one storage medium, wherein when executing the set of instructions, the at least one processor is directed to cause the system to:
   obtain a first image of a target scene under a first exposure time, wherein the target scene is related to a light status of a light;
   obtain a second image of the target scene under a second exposure time, wherein the first exposure time is longer than the second exposure time; and
   generate a target image by adjusting the light status in the first image based on the light status in the second image,
   wherein the target scene is in a first area of interest (AOI), the light status in the first image is in the first AOI of the first image, the light status in the second image is in the first AOI of the second image, and
   to adjust the light status in the first image, the at least one processor is directed to cause the system to adjust at least one of a shape or a color of the light status in the first AOI of the first image based on the light status in the first AOI of the second image.

2. The system of claim 1, wherein
   a color and a shape of the light status in the second image are substantially correct with respect to a color and a shape of the light, and
   at least one of the color or the shape of the light status in the first image is substantially distorted with respect to the color or shape of the light.

3. The system of claim 1, wherein to adjust the light status in the first image, the at least one processor is directed to cause the system to:
   fuse the first AOI of the first image with the first AOI of the second image.

4. The system of claim 3, wherein to fuse the first AOI of the first image with the first AOI of the second image, the at least one processor is directed to cause the system to:
   determine a binary image based on the first image and the second image, the binary image including a first binary value and a second binary value smaller than the first binary value;
   generate a fusion mask based on the binary image; and
   fuse the first AOI of the first image with the first AOI of the second image based on the generated fusion mask.

5. The system of claim 4, wherein to determine the binary image, the at least one processor is directed to cause the system to:
   for each pixel in the second image, determine a first ratio of a first color channel and a second color channel;
   for each pixel in the first image, determine a second ratio of the first color channel and the second color channel; and
   upon determining that a difference between the first ratio and the second ratio is greater than a first threshold, and that the first color channel in the first image is greater than a second threshold, assign the pixel with the first binary value.

6. The system of claim 1, wherein to generate the target image, the at least one processor is directed to cause the system to:
   process the first image by reducing a halo of the first image at least based on a first color channel of at least one pixel in the first image and a second color channel of at least one pixel in the first image; and
   generate the target image by adjusting the light status in the processed first image based on the light status in the second image.

7. A method for processing images, comprising:
   obtaining a first image of a target scene under a first exposure time, wherein the target scene is related to a light status of a light;
   obtaining a second image of the target scene under a second exposure time, wherein the first exposure time is longer than the second exposure time; and
   generating a target image by adjusting the light status in the first image based on the light status in the second image,
   wherein the target scene is in a first area of interest (AOI), the light status in the first image is in the first AOI of the first image, the light status in the second image is in the first AOI of the second image, and
   the adjusting the light status in the first image includes adjusting at least one of a shape or a color of the light status in the first image based on the light status in the second image.

8. The method of claim 7, wherein
   a color and a shape of the light status in the second image are substantially correct with respect to a color and a shape of the light, and
   at least one of the color or the shape of the light status in the first image is substantially distorted with respect to the color or shape of the light.

9. The method of claim 7, wherein the adjusting of the light status in the first image includes:
   fusing the first AOI of the first image with the first AOI of the second image.

10. The method of claim 9, wherein the fusing of the first AOI of the first image with the first AOI of the second image includes:
    determining a binary image based on the first image and the second image, the binary image including a first binary value and a second binary value smaller than the first binary value;
    generating a fusion mask based on the binary image; and
    fusing the first AOI of the first image with the first AOI of the second image based on the generated fusion mask.

11. The method of claim 10, wherein the determining of the binary image includes:
    for each pixel in the second image, determining a first ratio of a first color channel and a second color channel;

for each pixel in the first image, determining a second ratio of the first color channel and the second color channel; and upon determining that a difference between the first ratio and the second ratio is greater than a first threshold, and that the first color channel in the first image is greater than a second threshold, assigning the pixel with the first binary value.

12. The method of claim 7, wherein the generating the target image includes:

processing the first image by reducing a halo of the first image at least based on a first color channel of at least one pixel in the first image and a second color channel of at least one pixel in the first image; and generating the target image by adjusting the light status in the processed first image based on the light status in the second image.

13. A system for processing images, comprising:

at least one storage medium including a set of instructions; and at least one processor in communication with the at least one storage medium, wherein when executing the set of instructions, the at least one processor is directed to cause the system to:

obtain a light status of a light;

obtain an image of the light in the light status;

extract a halo region and a highlight region in the obtained image based on the light status; and upon a determination that the halo region and the highlight region overlap, determine that a predefined light effect exists in the obtained image of the light.

14. The system of claim 13, wherein to extract the halo region in the obtained image based on the light status, the at least one processor is directed to cause the system to:

for each pixel in the obtained image, determine the pixel to be in the halo region when a color of the pixel is within a first color range corresponding to the light status;

determine a binary image corresponding to the obtained image by assigning at least one pixel in the obtained image with a first binary value or a second binary value according to whether the pixel is in the halo region;

generate an eroded image by eroding the binary image; and extract the halo region by dilating the eroded image.

15. The system of claim 13, wherein to extract the highlight region in the obtained image based on the light status, the at least one processor is directed to cause the system to:

for each pixel in the obtained image, determine the pixel to be in the highlight region when a color of the pixel is within a second color range corresponding to the light status and when a brightness of the pixel is greater than a threshold;

determine a binary image corresponding to the obtained image by assigning at least one pixel in the obtained image with a first binary value or a second binary value according to whether the pixel is in the highlight region;

generate an eroded image by eroding the binary image; and extract the highlight region by dilating the eroded image.

16. The system of claim 13, wherein before the extracting of the halo region and the highlight region in the obtained image, the at least one image processing device is configured to determine a second area of interest (AOI) in the obtained image, and wherein to extract the halo region and the highlight region in the obtained image, the at least one processor is directed to cause the system to:

extract the halo region and the highlight region in the second AOI.

17. The system of claim 13, wherein the halo region includes at least one first connected region, and the highlight region includes at least one second connected region, and at least one processor is directed to cause the system to:

for each second connected region, determine an overlapped region between the second connected region and the at least one first connected region; and determine the second connected region to correspond to the predefined light effect when a ratio of the overlapped region and the second connected region is greater than a threshold.

* * * * *